United States Patent
Cho et al.

(10) Patent No.: US 8,625,630 B2
(45) Date of Patent: Jan. 7, 2014

(54) METHOD AND APPARATUS FOR UPDATING SYSTEM INFORMATION IN BROADBAND WIRELESS COMMUNICATION SYSTEM

(75) Inventors: Hee-Jeong Cho, Anyang-si (KR);
Ki-Seon Ryu, Anyang-si (KR);
Doo-Hyun Sung, Anyang-si (KR);
Yong-Ho Kim, Anyang-si (KR);
Young-Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 255 days.

(21) Appl. No.: 12/718,887

(22) Filed: Mar. 5, 2010

(65) Prior Publication Data

US 2010/0226389 A1 Sep. 9, 2010

Related U.S. Application Data

(60) Provisional application No. 61/157,561, filed on Mar. 5, 2009, provisional application No. 61/228,956, filed on Jul. 27, 2009.

(30) Foreign Application Priority Data

Mar. 4, 2010 (KR) ........................ 10-2010-0019513

(51) Int. Cl.
H04J 3/16 (2006.01)
(52) U.S. Cl.
USPC .......................................... 370/465; 370/345
(58) Field of Classification Search
None
See application file for complete search history.

(56) References Cited

U.S. PATENT DOCUMENTS

| 6,195,699 | B1 * | 2/2001 | Dennis | 709/229 |
| 2001/0033560 | A1 * | 10/2001 | Tong et al. | 370/337 |
| 2003/0117969 | A1 * | 6/2003 | Koo et al. | 370/318 |
| 2005/0032542 | A1 | 2/2005 | Wilborn et al. | |
| 2005/0255862 | A1 | 11/2005 | Jung et al. | |
| 2006/0251028 | A1 | 11/2006 | Nagata et al. | |

(Continued)

FOREIGN PATENT DOCUMENTS

| CN | 1794827 | 6/2006 |
| CN | 1929614 | 3/2007 |

(Continued)

OTHER PUBLICATIONS

Japan Patent Office Application Serial No. 2011-551023, Office Action dated Feb. 13, 2013, 2 pages.

(Continued)

*Primary Examiner* — David Oveissi
(74) *Attorney, Agent, or Firm* — Lee, Hong, Degerman, Kang & Waimey

(57) ABSTRACT

A method for updating system information in a terminal in which data is transmitted by means of superframes, includes: receiving system information, scheduling periodicity information of the system information and changing information indicating changing status of the system information transmitted by means of a superframe header (SFH) from a base station; and updating the system information based on the changing information, wherein the SFH comprises a primary SFH including the changing information and a secondary SFH including at least one subpacket containing the system information, the scheduling periodicity information indicating a transmission periodicity of the subpacket is transmitted by means of the primary SFH or a predetermined subpacket, and when the terminal detects that a changed system information transmitted by means of the subpacket is not scheduled as indicated in the scheduling periodicity information, the terminal wakes up until the changed system information is received.

12 Claims, 25 Drawing Sheets

(56) References Cited

U.S. PATENT DOCUMENTS

| | | | |
|---|---|---|---|
| 2007/0211661 A1 | 9/2007 | Tee et al. | |
| 2007/0248086 A1 | 10/2007 | Petersen | |
| 2008/0002713 A1 | 1/2008 | Fujita | |
| 2008/0056188 A1 | 3/2008 | Lu et al. | |
| 2008/0192931 A1* | 8/2008 | Cho et al. | 380/258 |
| 2008/0225823 A1 | 9/2008 | Tenny | |
| 2009/0086641 A1 | 4/2009 | Mushtaq et al. | |
| 2009/0092076 A1 | 4/2009 | Zheng et al. | |
| 2009/0141670 A1 | 6/2009 | Ho | |
| 2010/0205283 A1* | 8/2010 | Cho et al. | 709/221 |
| 2010/0220691 A1* | 9/2010 | Chang et al. | 370/336 |

FOREIGN PATENT DOCUMENTS

| | | |
|---|---|---|
| CN | 102308495 | 1/2012 |
| JP | 2004-531937 | 10/2004 |
| JP | 2007-116639 | 5/2007 |
| JP | 2008-278343 | 11/2008 |
| JP | 2010-114671 | 5/2010 |
| KR | 10-2007-0001266 | 1/2007 |
| KR | 10-2007-0011170 | 1/2007 |
| WO | 2008/089114 | 7/2008 |
| WO | 2008/156314 | 12/2008 |

OTHER PUBLICATIONS

State Intellectual Property Office of the People's Republic of China Application Serial No. 201080010091.7, Office Action dated Aug. 22, 2013, 9 pages.

United States Patent and Trademark Office U.S. Appl. No. 13/141,321, Final Office Action dated Sep. 20, 2013, 24 pages.

* cited by examiner

Fig. 10

| SFN | #0 | #1 | #2 | #3 | #4 | #5 | #6 | #7 | #8 | #9 | #10 | #11 | #12 |
|---|---|---|---|---|---|---|---|---|---|---|---|---|---|
| transmitted SP | SP1 | SP2 | SP1 | SP3 | SP1 | SP2 | SP1 | | SP1 | SP2 | SP1 | SP3 | SP1 |
| SP1 offset | 0 | 1 | 0 | 1 | 0 | 1 | 0 | 1 | 0 | 1 | 0 | 1 | 0 |
| SP2 offset | 1 | 0 | 3 | 2 | 1 | 0 | 3 | 2 | 1 | 0 | 3 | 2 | 1 |
| SP3 offset | 3 | 2 | 1 | 0 | 7 | 6 | 5 | 4 | 3 | 2 | 1 | 0 | 7 |

8 sets of the offsets

Fig. 11

| SFN | #0 | #1 | #2 | #3 | #4 | #5 | #6 | #7 | #8 | #9 | #10 | #11 | #12 | #13 | #14 | #15 | #16 | #17 | #18 | #19 | #20 |
|---|---|---|---|---|---|---|---|---|---|---|---|---|---|---|---|---|---|---|---|---|---|
| transmitted SP | SP1 | SP2 | SP3 | | SP1 | | | | SP1 | SP2 | | | SP1 | | | | SP1 | SP2 | SP3 | | SP1 |
| SP1 offset | 0 | 3 | 2 | 1 | 0 | 3 | 2 | 1 | 0 | 3 | 2 | 1 | 0 | 3 | 2 | 1 | 0 | 3 | 2 | 1 | 0 |
| SP2 offset | 1 | 0 | 7 | 6 | 5 | 4 | 3 | 2 | 1 | 0 | 7 | 6 | 5 | 4 | 3 | 2 | 1 | 0 | 7 | 6 | 5 |
| SP3 offset | 2 | 1 | 0 | 15 | 14 | 13 | 12 | 11 | 10 | 9 | 8 | 7 | 6 | 5 | 4 | 3 | 2 | 1 | 0 | 15 | 14 |

Fig. 12

| SFN | #0 | #1 | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|---|---|
| transmitted SP | SP 1 | SP 2 | SP 1 | SP 3 | SP 1 | SP 2 | SP 1 | | SP 1 | SP 2 | SP 1 | SP 3 | SP 1 | SP 2 | SP 1 | | SP 1 |
| SP2 offset | 1 | | 2 | | 1 | | 2 | | 1 | | 2 | | 1 | | 2 | | 1 |
| SP3 offset | 2 | | 1 | | 4 | | 3 | | 2 | | 1 | | 4 | | 3 | | 2 |

4 sets of the offsets

Fig. 13

| SFN | #0 | #1 | #2 | #3 | #4 | #5 | #6 | #7 | #8 | #9 | #10 | #11 | #12 | #13 | #14 | #15 | #16 | #17 | #18 | #19 | #20 |
|---|---|---|---|---|---|---|---|---|---|---|---|---|---|---|---|---|---|---|---|---|---|
| transmitted SP | SP1 | SP2 | SP3 | | SP1 | | | | SP1 | SP2 | | | SP1 | | | | SP1 | SP2 | SP3 | | SP1 |
| SP2 offset | 1 | | | | 4 | | | | 1 | | | | 4 | | | | 1 | | | | 4 |
| SP3 offset | 2 | | | | 11 | | | | 8 | | | | 5 | | | | 2 | | | | 11 |

| SFN | #0 | #1 | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|---|---|
| transmitted SP | SP 1 | SP 2 | SP 1 | SP 3 | SP 1 | SP 2 | SP 1 | | SP 1 | SP 2 | SP 1 | SP 3 | SP 1 | SP 2 | SP 1 | | SP 1 |
| SP1 offset | | 1 | | | | 1 | | | | 1 | | | | 1 | | | |
| SP3 offset | | 2 | | | | 5 | | | | 2 | | | | 5 | | | |

2 sets of the offsets

| SFN | #0 | #1 | #2 | #3 | #4 | #5 | #6 | #7 | #8 | #9 | #10 | #11 | #12 | #13 | #14 | #15 | #16 | #17 | #18 | #19 | #20 |
|---|---|---|---|---|---|---|---|---|---|---|---|---|---|---|---|---|---|---|---|---|---|
| transmitted SP | SP1 | SP2 | SP3 | | SP1 | | | | SP1 | SP2 | | | SP1 | | | | SP1 | SP2 | SP3 | | SP1 |
| SP1 offset | | 3 | | | | | | | | 3 | | | | | | | | 3 | | | |
| SP3 offset | | 1 | | | | | | | | 8 | | | | | | | | 1 | | | |

Fig. 16

| SFN | #0 | #1 | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|---|---|
| transmitted SP | SP 1 | SP 2 | SP 1 | SP 3 | SP 1 | SP 2 | SP 1 | | SP 1 | SP 2 | SP 1 | SP 3 | SP 1 | SP 2 | SP 1 | | SP 1 |
| SP1 offset | | | | 1 | | | | | | | | 1 | | | | | |
| SP2 offset | | | | 2 | | | | | | | | 2 | | | | | |

1 set of the offsets

Fig. 18

| SFN | #0 | #1 | #2 | #3 | #4 | #5 | #6 | #7 | #8 | #9 | #10 | #11 | #12 | #13 | #14 | #15 | #16 | #17 | #18 | #19 | #20 |
|---|---|---|---|---|---|---|---|---|---|---|---|---|---|---|---|---|---|---|---|---|---|
| transmitted SP | SP1 | SP2 | SP3 | | SP1 | | | | SP1 | | SP2 | | SP1 | | | | SP1 | SP2 | SP3 | | SP1 |
| SP1 offset | | | 0 | | | | | | | | | | | | | | | | | | |
| SP2 offset | | | 1 | | | | | | | | | | | | | | | | | | |

1st period: #3 – #9

2nd period: #10 – #17

Fig. 20

METHOD AND APPARATUS FOR UPDATING SYSTEM INFORMATION IN BROADBAND WIRELESS COMMUNICATION SYSTEM

RELATED APPLICATION

The present disclosure relates to subject matter contained in priority U.S. Provisional Application No. 61/157,561, filed on Mar. 5, 2009, U.S. Provisional Application No. 61/228,956, filed on Jul. 27, 2009, and Korean Application No. 10-2010-0019513 filed on Mar. 4, 2010, which is herein expressly incorporated by reference in its entirety.

TECHNICAL FIELD

The present invention relates to updating of system information in a broadband wireless communication system and, more particularly, to a method and apparatus for updating system information transferred via a superframe header.

BACKGROUND ART

For communication between a base station and a terminal in a broadband wireless communication system, system information requisite for communication must be transmitted from the base station to the terminal. The base station may transfer essential system information requisite for its communication with the terminal via a superframe header (SFH) and transfer additional system information via a broadcast message.

Among the system information, the essential system information transferred via the SFH must be periodically updated for continuous communication between the base station and the terminal, and the terminal must periodically check whether or not the essential system information transferred from the base station has been changed, and perform decoding and updating on the system information.

However, with the system information not changed, if the terminal always decodes and updates the system information transferred via the SFH or the like, power of the terminal is unnecessarily consumed. In particular, if the terminal in a sleep mode or in an idle mode decodes and updates the system information transferred via the SFH, it would be ineffective in terms of power consumption of the terminal.

Thus, a more effective system information updating method is required to prevent power consumption of the terminal.

DISCLOSURE OF THE INVENTION

Therefore, an object of the present invention is to provide a method and apparatus for effectively updating system information by not allowing a terminal to decode unnecessary system information and preventing power consumption.

To achieve these and other advantages and in accordance with the purpose of the present invention, as embodied and broadly described herein, there is provided a method for updating system information in a terminal in which data is transmitted and received via a superframe, including: receiving system information, scheduling periodicity information of the system information and changing information indicating changing status of the system information transmitted by means of a superframe header (SFH) from a base station, and updating the system information based on the changing information, wherein the SFH comprises a primary SFH (P-SFH) including the changing information and a secondary SFH (S-SFH) including at least one subpacket containing the system information, the scheduling periodicity information indicating a transmission periodicity of the subpacket is transmitted by means of the P-SFH or a predetermined subpacket, and when the terminal detects that a changed system information transmitted by means of the subpacket is not scheduled as indicated in the scheduling periodicity information, the terminal wakes up until the changed system information is received.

In one exemplary embodiment, the S-SFH comprises three subpackets each having a different transmission periodicity and the changing information comprises a bitmap consist of three bits indicating a changing status of the three subpackets respectively, and when any value of the subpackets is changed, a bit at a corresponding position in the bitmap is toggled or set to 1.

In another embodiment, the changing information includes a change count which is incremented by 1 modulo 16 whenever any value of the subpacket is changed.

In another embodiment, the method may further includes a step of storing the changing information, wherein the S-SFH comprises three subpackets each having a different transmission periodicity and the changing information including a change count and a bitmap consist of three bits indicating a changing status of the three subpackets respectively, and wherein the step of updating the system information comprises comparing the received change count with a stored change count, and updating the changed system information based on the bitmap, if there is a difference between the received change count and the stored change count.

In another embodiment, the step of receiving further receives transmission offset information indicating a distance between a superframe containing the subpacket and a superframe containing the scheduling periodicity information.

To achieve the above object, there is also provided a method for updating system information in a terminal in which data is transmitted by means of superframes, the method including: receiving system information, scheduling periodicity information of the system information and changing information indicating changing status of the system information transmitted by means of a superframe header (SFH) from a base station, and updating the system information based on the changing information, wherein the SFH comprises a primary SFH (P-SFH) including the changing information and a secondary SFH (S-SFH) including at least one subpacket containing the system information, the scheduling periodicity information indicating a transmission periodicity of the subpacket is transmitted by means of a predetermined subpacket, and when the terminal detects that a changed system information transmitted by means of the subpacket is not scheduled as indicated in the scheduling periodicity information, the terminal wakes up until the scheduling periodicity information is received through the predetermined subpacket and uses the scheduling periodicity information to update the system information.

In one exemplary embodiment, the S-SFH comprises three subpackets each having a different transmission periodicity and the changing information comprises a bitmap consist of three bits indicating a changing status of the three subpackets respectively, and when any value of the subpackets is changed, a bit at a corresponding position in the bitmap is toggled or set to 1.

In another embodiment, the changing information includes a change count which is incremented by 1 modulo 16 whenever any value of the subpacket is changed.

In another embodiment, the method may further includes a step of storing the changing information, wherein the S-SFH comprises three subpackets each having a different transmission periodicity and the changing information including a change count and a bitmap consist of three bits indicating a changing status of the three subpackets respectively, and wherein the step of updating the system information comprises comparing the received change count with a stored change count, and updating the changed system information based on the bitmap, if there is a difference between the received change count and the stored change count.

In another embodiment, the step of receiving further receives transmission offset information indicating a distance between a superframe containing the subpacket and a superframe containing the scheduling periodicity information.

To achieve the above object, there is also provided an apparatus for updating system information, including: a receiver for receiving system information and changing information indicating changing status of the system information transmitted by means of a superframe header (SFH) from a base station, and a controller for updating the system information based on the changing information, wherein the SFH comprises a primary SFH (P-SFH) including the changing information and a secondary SFH (S-SFH) including at least one subpacket containing the system information, a scheduling periodicity information indicating transmission periodicity of the subpacket is received by means of a predetermined subpacket, and when the controller detects that a changed system information transmitted by means of the subpacket is not scheduled as indicated in the scheduling periodicity information, the controller controls a system operation mode as wake-up mode until the changed system information is received.

In one exemplary embodiment, the S-SFH comprises three subpackets each having a different transmission periodicity and the changing information comprises a bitmap consist of three bits indicating a changing status of the three subpackets respectively, and when any value of the subpackets is changed, a bit at a corresponding position in the bitmap is toggled or set to 1.

In another embodiment, the changing information comprises a change count which is incremented by 1 modulo 16 whenever any value of the subpacket is changed.

In another embodiment, the apparatus may further includes a memory for storing the changing information, wherein the S-SFH comprises three subpackets each having a different transmission periodicity and the changing information including a change count and a bitmap consist of three bits indicating a changing status of the three subpackets respectively, and the controller comparing the change count received by the receiver with a change count stored in the memory and updating the changed system information based on the bitmap, if there is a difference between the received change count and the stored change count.

In another embodiment, the receiver receives transmission offset information indicating a distance between a superframe containing the subpacket and a superframe containing the scheduling periodicity information.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 10 shows a transmission offset information transmitted through a P-SFH when a periodicity configuration index is 0 according to an exemplary embodiment of the present invention;

FIG. 11 shows a transmission offset information transmitted through a P-SFH when a periodicity configuration index is 1 according to an exemplary embodiment of the present invention;

FIG. 12 shows a transmission offset information transmitted through an S-SFH SP1 when a periodicity configuration index is 0 according to an exemplary embodiment of the present invention;

FIG. 13 shows a transmission offset information transmitted through an S-SFH SP1 when a periodicity configuration index is 1 according to an exemplary embodiment of the present invention;

FIG. 14 shows a transmission offset information transmitted through an S-SFH SP2 when a periodicity configuration index is 0 according to an exemplary embodiment of the present invention;

FIG. 15 shows a transmission offset information transmitted through an S-SFH SP2 when a periodicity configuration index is 1 according to an exemplary embodiment of the present invention;

FIG. 16 shows a transmission offset information transmitted through an S-SFH SP3 when a periodicity configuration index is 0 according to an exemplary embodiment of the present invention;

FIG. 18 shows a simplified transmission offset information transmitted through an S-SFH SP3 according to an exemplary embodiment of the present invention;

FIG. 20 shows an update method of S-SFH when the terminal detects that the changed S-SFH SP is not scheduled as defined in the last SP scheduling periodicity information according to an exemplary embodiment of the present invention;

MODES FOR CARRYING OUT THE PREFERRED EMBODIMENTS

Figure 1:
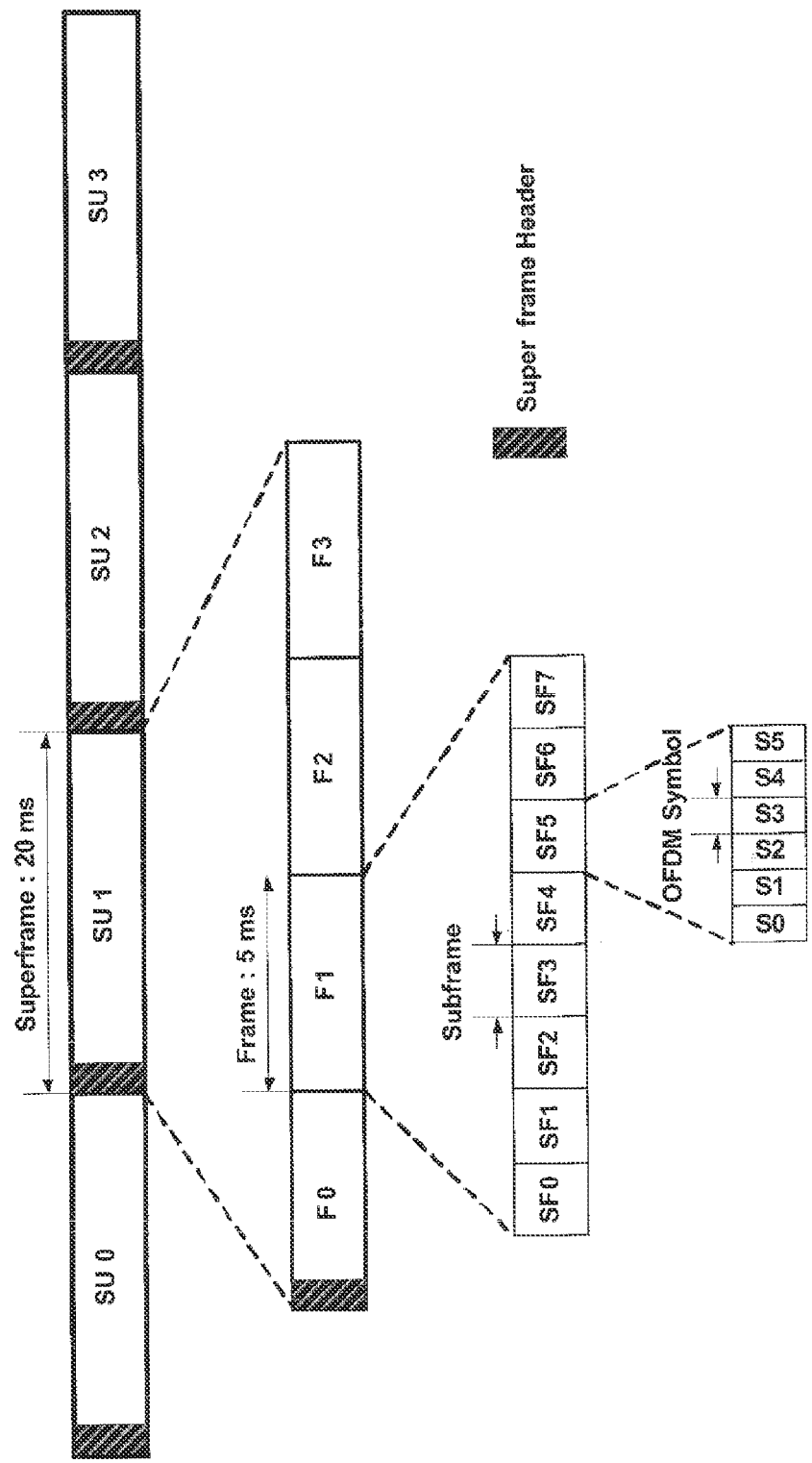
FIG. 1 shows the structure of an upper level frame.

Exemplary embodiments of the present invention will now be described in detail with reference to the accompanying drawings. The same reference numerals will be used throughout to designate the same or like components and a repeated description will be omitted. In describing the present invention, if a detailed explanation for a related known function or construction is considered to unnecessarily divert the gist of the present invention, such explanation will be omitted but would be understood by those skilled in the art. In the drawings, the shapes and dimensions may be exaggerated for clarity, and the same reference numerals will be used throughout to designate the same or like components. The accompanying drawings, which are given by illustration only, and thus are not limitative of the present invention.

A communication system according to an exemplary embodiment of the present invention is a system for providing various communication services such as voice data, packet data, and the like, which includes a base station and a terminal.

The terminal according to an exemplary embodiment of the present invention may also be referred to as subscriber station (SS), user equipment (UE), mobile equipment (ME), mobile station (MS), and the like, and may include a portable device having a communication function such as a mobile phone, a PDA, a smart phone, a notebook, and the like or a non-portable device such as a PC or a vehicle-mounted device.

The base station (BS) refers to a fixed position communicating with the terminal and may also be referred to as eNB (evolved-NodeB), base transceiver system (BTS), access point (AP), and the like. One or more cells may exist in one base station, and an interface for transmitting user traffic or control traffic may be used between base stations. Downlink refers to a communication channel from the BS to the terminal, and uplink refers to a communication channel from the terminal to the BS.

A multiple access scheme applied to the wireless communication system according to an exemplary embodiment of the present invention includes any multi-access scheme such as a code division multiple access (CDMA), a time division multiple access (TDMA), a frequency division multiple access (FDMA), a single carrier-frequency division multiple access (SC-FDMA), an orthogonal frequency division multiple access (OFDMA), and the like.

Multiple access methods for downlink and uplink transmission may differ, and for example, downlink may employ an OFDMA scheme while uplink may employ an SC-FDMA scheme.

Embodiments of the present invention will be described below in detail with reference to the accompanying drawings, where those components are rendered the same reference number that are the same or are in correspondence, regardless of the figure number, and redundant explanations are omitted.

FIG. 1 shows a basic frame structure.

As shown in FIG. 1, the frame structure applied to the system of the present invention may include a frame of 5 ms as a basic element, and the frame, a basic single transmission unit, may be defined as an interval between preambles. The frame includes at least one subframe, and may include a plurality of transmission time intervals (TTI) each having a different size. The TTI is a basic unit of scheduling performed at a medium access control (MAC) layer. The TTI may be a radio resource allocation unit.

A superframe is configured with a plurality of frames. The superframe may be configured in the unit of, for example, 20 ms. When a superframe is configured, system configuration information and broadcast information for an initial fast cell selection and low latency service are set as a transmission unit, and in general, two to six frames form a single superframe. In addition, each frame in the unit of 5 ms includes a plurality of subframes, and each subframe includes a plurality of OFDM/OFDMA symbols. Each superframe includes a single superframe header (SFH) including a broadcast channel, and the SFH is positioned at a first subframe of the corresponding superframe. A substantial frame structure may be designed depending on the bandwidth of a system channel, a duplexing method, a cyclic prefix (CP) length, and the like.

Figure 2:
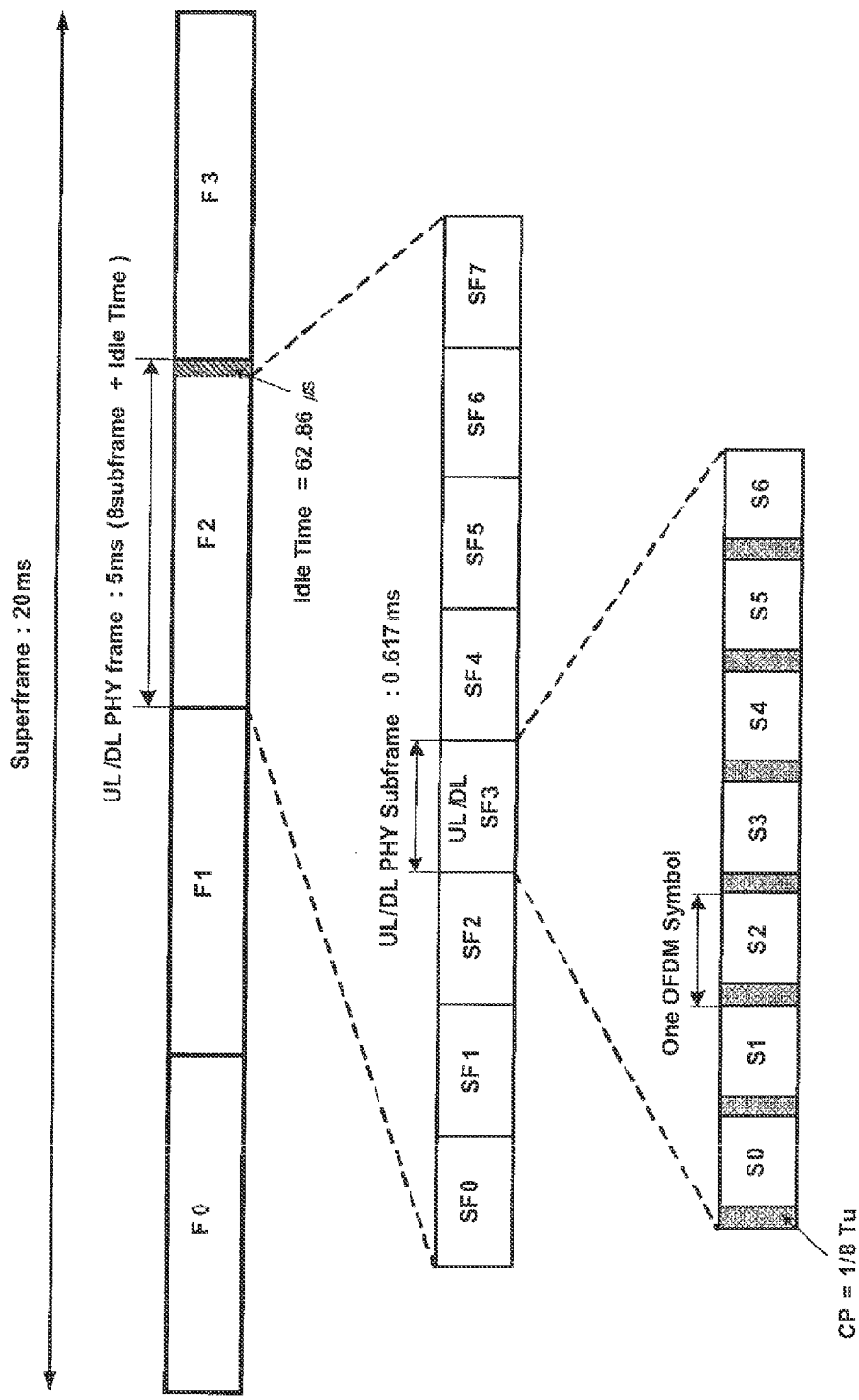
FIG. 2 shows the structure of a frequency division duplex (FDD) type frame.

FIG. 2 shows a frame structure for a frequency division duplex (FDD) mode.

In the FDD mode, downlink and uplink transmissions are discriminated on a frequency domain, and every subframe of each frame is available for downlink and uplink transmission. A terminal in the FDD mode may access an uplink subframe and, at the same time, receive a data burst via any of downlink subframe.

As shown in FIG. 2, a superframe of 20 ms includes four frames (F0, F1, F2, F3) with a length of 5 ms, and one frame F2 includes eight subframes (SF0, SF1, SF2, SF3, SF4, SF5, SF6, SF7) with a length of 0.617 ms and an idle time interval of 62.86 μs. Each subframe may include seven OFDM symbols (S0, S1, S2, S3, S4, S5, S6).

Figure 3:
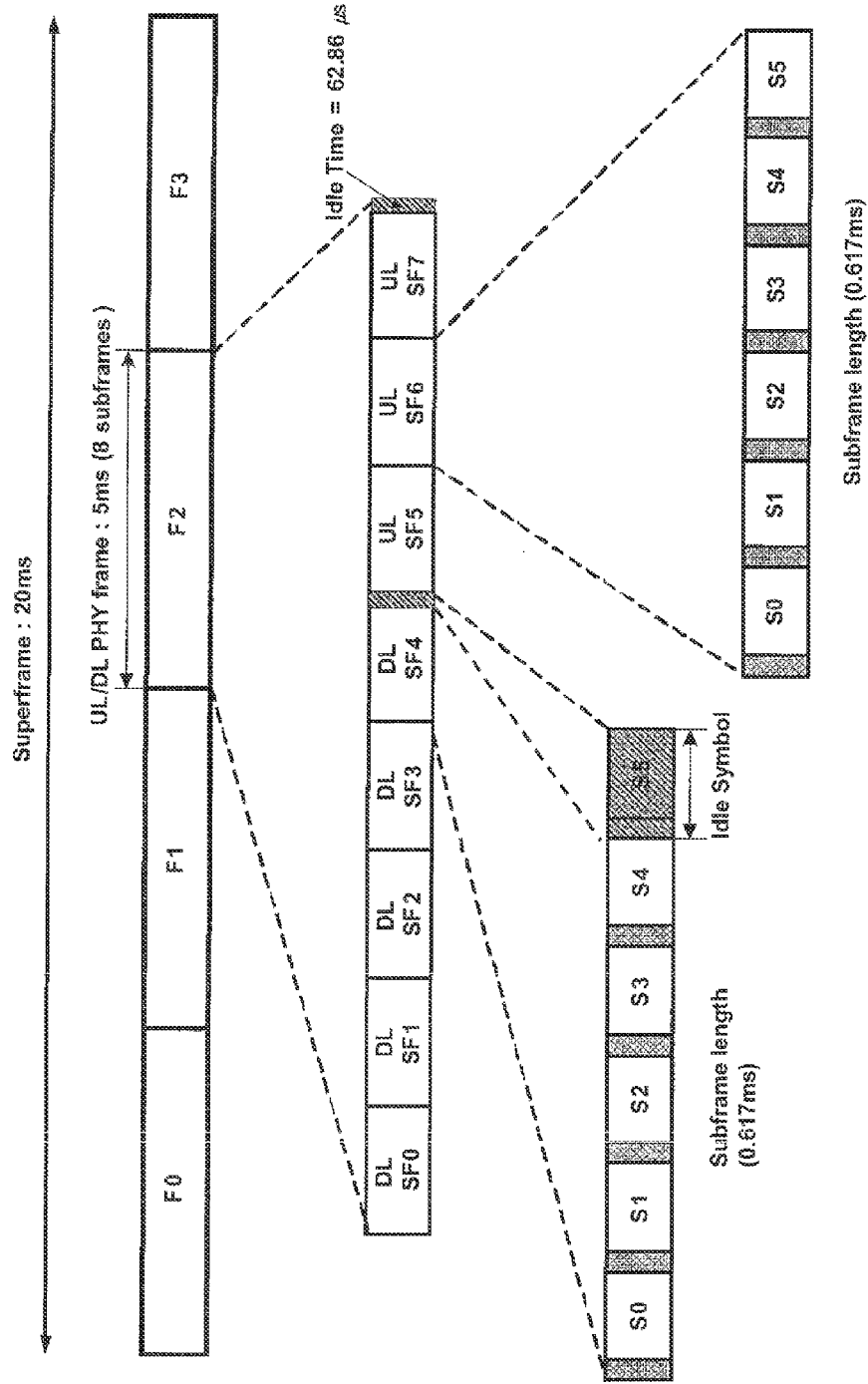
FIG. 3 shows the structure of a time division duplex (TDD) type frame.

FIG. 3 shows a frame structure for a time division duplex (TDD) mode.

In a TDD mode, downlink and uplink transmissions are discriminated on a time domain, and an uplink transmission time interval is allocated following a downlink transmission time interval, so that data is transmitted and received via downlink and uplink.

As shown in FIG. 3, one superframe of 20 ms includes four frames (F0, F1, F2, F3) of 5 ms, and one frame F2 includes eight subframes (SF0, SF1, SF2, SF3, SF4, SF5, SF6, SF7) with a length of 0.617 ms and an idle time interval of 62.86 μs. The frame F2 includes D number of downlink frames and U number of uplink frames determined according to a ratio (D:U) of downlink (DL) and uplink (UL). When the ratio of DL and UL is 5:3, five subframes (SF0, SF1, SF2, SF3, SF4) are configured as downlink frames and three subframes (SF5, SF6, SF7) are configured as uplink frames. One idle symbol for discriminating DL and UL is inserted between the final downlink subframe SF4 and the first uplink subframe SF5 to indicate switching from the DL to UL. The gap inserted between the downlink and the uplink is called a transmit transition gap (TTG), and a gap inserted between uplink and downlink is called a receive transition gap (RTG), by which a transmission end and a reception end can discriminate a downlink transmission and an uplink transmission.

Also, the final downlink subframe SF4 includes five OFDM symbols and a final one idle symbol S5. The idle symbol S5 serves as a TTG discriminating downlink (DL) and uplink (UL).

A superframe header (SFH) will now be described in detail.

In a broadband wireless access system, an SFH transfers system information essential for communication between terminals and a base station to the terminals. As shown in FIG. 1, the SFH is positioned at the first subframe within a single superframe. The SFH may includes a primary SFH (P-SFH) delivering control information for receiving the SFH and a secondary-SFH (S-SFH) delivering essential system information such as network entry.

The S-SFH may include a plurality of subpackets (SP) according to a transmission frequency of system information, and preferably, the S-SFH includes three SPs (SP1, SP2, and SP3).

The P-SFH is transmitted during every superframe, and an information element (IE) of the P-SFH includes information related to 4-bit-LSB information of a superframe number (SFN) and the S-SFH. The information element of the P-SFH mean a set of information related to the superframe number and the S-SFH. The information related to the S-SFH includes an S-SFH change count indicating the version of a currently transmitted S-SFH, an S-SFH scheduling information bitmap indicating what kind of S-SFH SP(s) are transmitted in a corresponding superframe, an S-SFH size indicating the number of LRUs allocated for an S-SFH transmission, an S-SFH number of repetitions indicating a transmission format of an S-SFH, an S-SFH SP change bitmap indicating what kind of S-SFH SP has been changed, and the like. The size of the S-SFH scheduling information bitmap and the S-SFH SP change bitmap fields is equal to the total number of SPs of the S-SFH.

The S-SFH delivers actual system information (which is called an information element of the S-SFH), and as described above, the delivered system information may be included in three subpackets according to their characteristics, each of which is called an S-SFH SPn (n=1, 2, 3). Each S-SFH SP information element (IE) has a different transmission period. When a transmission period of the SP1 is $T_{SP1}$, that of the SP 2 is $T_{SP2}$, and that of the SP3 is $T_{SP3}$, the transmission periods of the subpackets may be represented by, for example, $T_{SP1} < T_{SP2} < T_{SP3}$.

For continued communication with the base station, the terminals must update system information transferred via the S-SFH SPs. In this case, however, if decoding and updating an S-SFH IE although system information has not been changed will be ineffective in terms of power consumption of the terminals. Thus, the present invention proposes a method for effectively updating system information transferred via an S-SFH.

The terminal must detect an information error in a P-SFH received from the base station before updating system information delivered from the base station.

Figure 4:
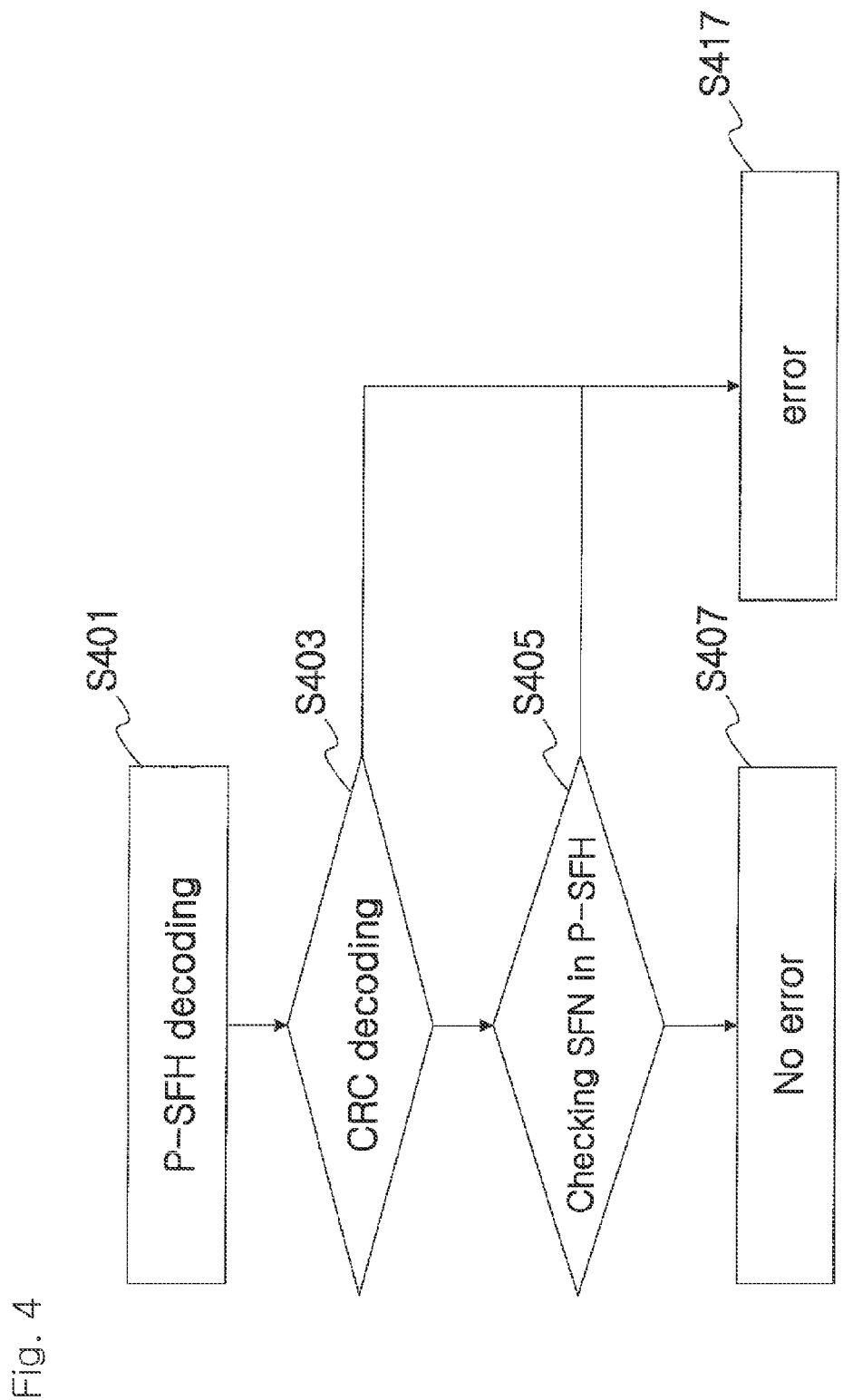
FIG. 4 shows a flow chart illustrating the process of detecting an information error in a P-SFH received by a terminal from a base station according to an exemplary embodiment of the present invention.

FIG. 4 shows a flow chart illustrating the process of detecting an information error in a P-SFH received by a terminal from a base station according to an exemplary embodiment of the present invention.

The P-SFH may include a 4-bit-LSB superframe number (SFN), an S-SFH change count (referred to as a 'CC', hereinafter), an S-SFH scheduling information bitmap, an S-SFH size, an S-SFH number of repetitions, an S-SFH SP change bitmap (referred to as a 'CB', hereinafter), as well as a cyclic redundancy check (CRC). In general, in order to check whether there is an error in the P-SFH transmitted via air interface, the terminal calculates a CRC value based on the received data. The terminal determines whether or not there is an error in information within the P-SFH according to the calculated CRC value.

Comparatively, however, the present invention proposes a process of additionally determining whether or not an error has occurred by using the 4-bit-LSB superframe number field within the P-SFH even when it is determined that there is no error in the general P-SFH error detection procedure through the CRC.

First, the terminal decodes the received P-SFH (S401).

The terminal primarily determines whether or not there is an error in the information within the P-SFH by decoding a CRC value included in the P-SFH (S403).

If the terminal determines that there is an error at the corresponding superframe according to the error generation determination result through the CRC checking, the superframe is processed as an error (S417), and if the terminal determines that there is no error at the corresponding superframe, the terminal successfully receives essential system information through an initial network registration (entry) process (DL synchronization), and calculates a superframe number (SFN).

The terminal determines whether or not the corresponding P-SFH has been properly transmitted without an error by checking the superframe number (SFN) within the P-SFH transmitted from the base station by comparing the calculated SFN (S405).

If the terminal determines that there is an error at the information within the P-SFH, it may process the corresponding superframe as having an error and does not take any further operation (S417).

If the SFN within the P-SFH transmitted from the base station and the SFN calculated by the terminal are determined to be the same, the terminal determines that the corresponding superframe does not have an error (S407).

When the S-SFH is transmitted during the corresponding superframe, the terminal is able to calculate a CRC with respect to the S-SFH, and if the terminal determines that there is no error in the information within the S-SFH, it may take a normal action on the corresponding superframe.

The procedure of updating essential system information by the terminal using the S-SFH change count and the S-SFH SP change bitmap delivered via the P-SFH will now be described.

Figure 5:
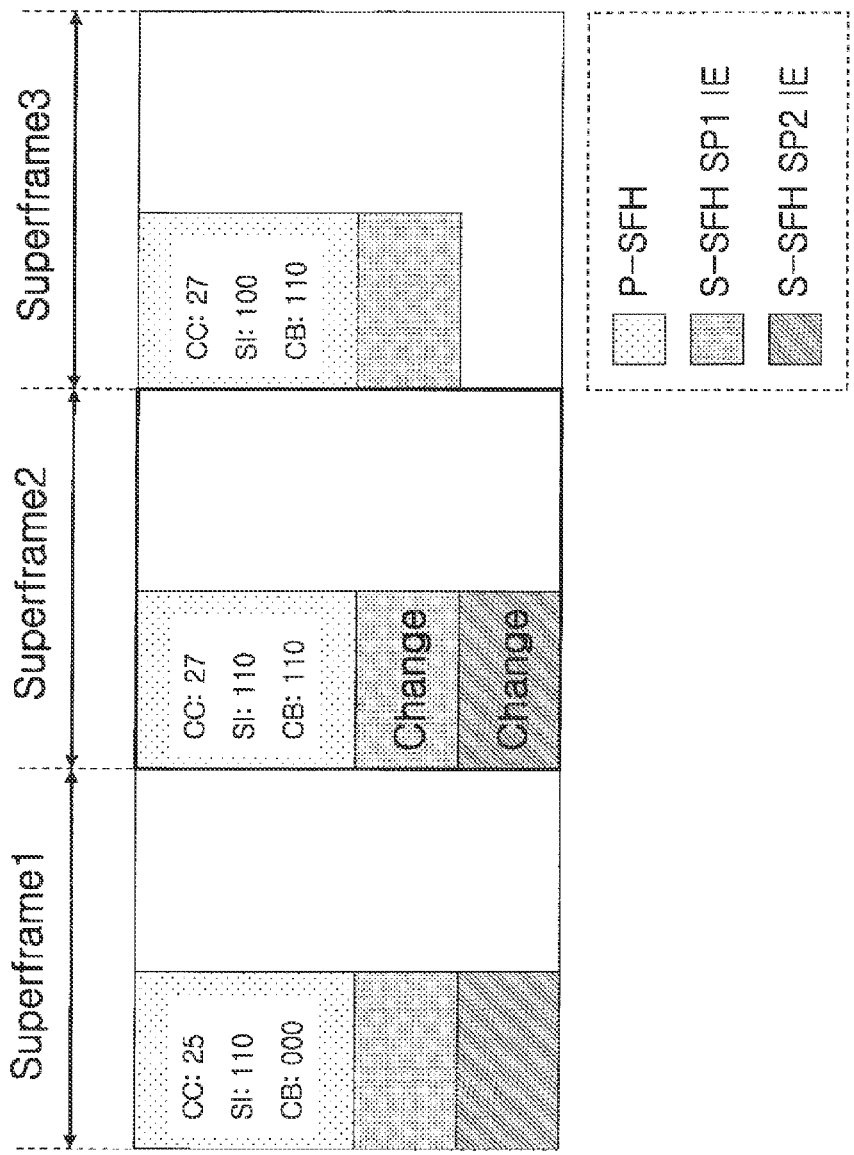
FIG. 5 shows a method of changing a change count (CC) of an S-SFH and S-SFH subpacket (SP) change bitmap (CB) information transferred via a P-SFH when system information is changed according to an exemplary embodiment of the present invention.

FIG. 5 shows a method of changing a change count (CC) of an S-SFH and S-SFH subpacket (SP) change bitmap (CB) information transferred via a P-SCH when system information is changed according to an exemplary embodiment of the present invention.

As illustrated in FIG. 5, the CC of the S-SFH delivered via the P-SFH can be changed whenever any of the values of the S-SFH subpacket (SP) IEs is changed.

The CC shown in FIG. 5 is a change count indicating whether or not the essential system information delivered via the S-SFH has been changed or not, and SI is a scheduling information bitmap indicating a transmitted S-SFH SP in the corresponding superframe. Also, the CB of the S-SFH indicates a changing status of the S-SFH SP IEs in the corresponding superframe. Each bit of the CB indicates the changing status of the corresponding S-SFH SP IE. The bit #0, bit #1 and bit #2 are mapped to S-SFH SP1 IE, S-SFH SP2 IE and S-SFH SP3 IE, respectively. If any of the value of an S-SFH SP IE is changed, the corresponding bit may be toggled or set to 1.

As illustrated, the CC, SI and CB information may be delivered via the P-SFH in the superframe. On the assumption that, the last stored CC value of a terminal is 25 and S-SFH SP1 and SP2 with unchanged system information are scheduled and transmitted by means of the superframe 1, the last received CC of the P-SFH of the superframe 1 is the same as the last stored CC. The SI bitmap transmitted by means of the superframe 1 is set to be '110' to indicate the SPs of the scheduled S-SFH are SP1 and SP2. The CB is '000' to indicate that the SP IEs remain unchanged.

In FIG. 5, as any system information transmitted via the S-SFH SPs is changed, the S-SFH CC increases in a superframe in which the changed S-SFH SP IE is first transmitted. Namely, the CC is increased from 25 to 27 in a superframe 2 at which the changed SP1 and SP2 are first transmitted.

In this case, because the counter is incremented according to the number of changed SPs and the information elements of two SPs are changed, the CC is 27 by incremented two counts.

Accordingly, in the P-SFH of the superframe 2, the CC is changed to 27, the SI bitmap is set to be '110' to indicate the SPs of the scheduled S-SFH are SP1 and SP2, and the CB is '110' to indicate the changed SP IEs are SP1 and SP2.

Also, system information has not been changed in a superframe 3 and only SP1 is scheduled, so the CC at the P-SFH of the superframe 3 is maintained as 27, the SI bitmap is set to be '100' in order to indicate the SP of the scheduled S-SFH is SP1, and the CB is maintained to be '110'.

According to another embodiment of the present invention, the CC may be increased by the number of a superframe (i.e., in the unit of superframe). Also, regardless of a transmission time point of the S-SFH SP IE, the CC may be increased in the superframe when the base station recognizes the necessity of changing for CC.

Hereinafter, a method of updating system information by the terminal upon receiving the change information will now be described.

Figure 6:
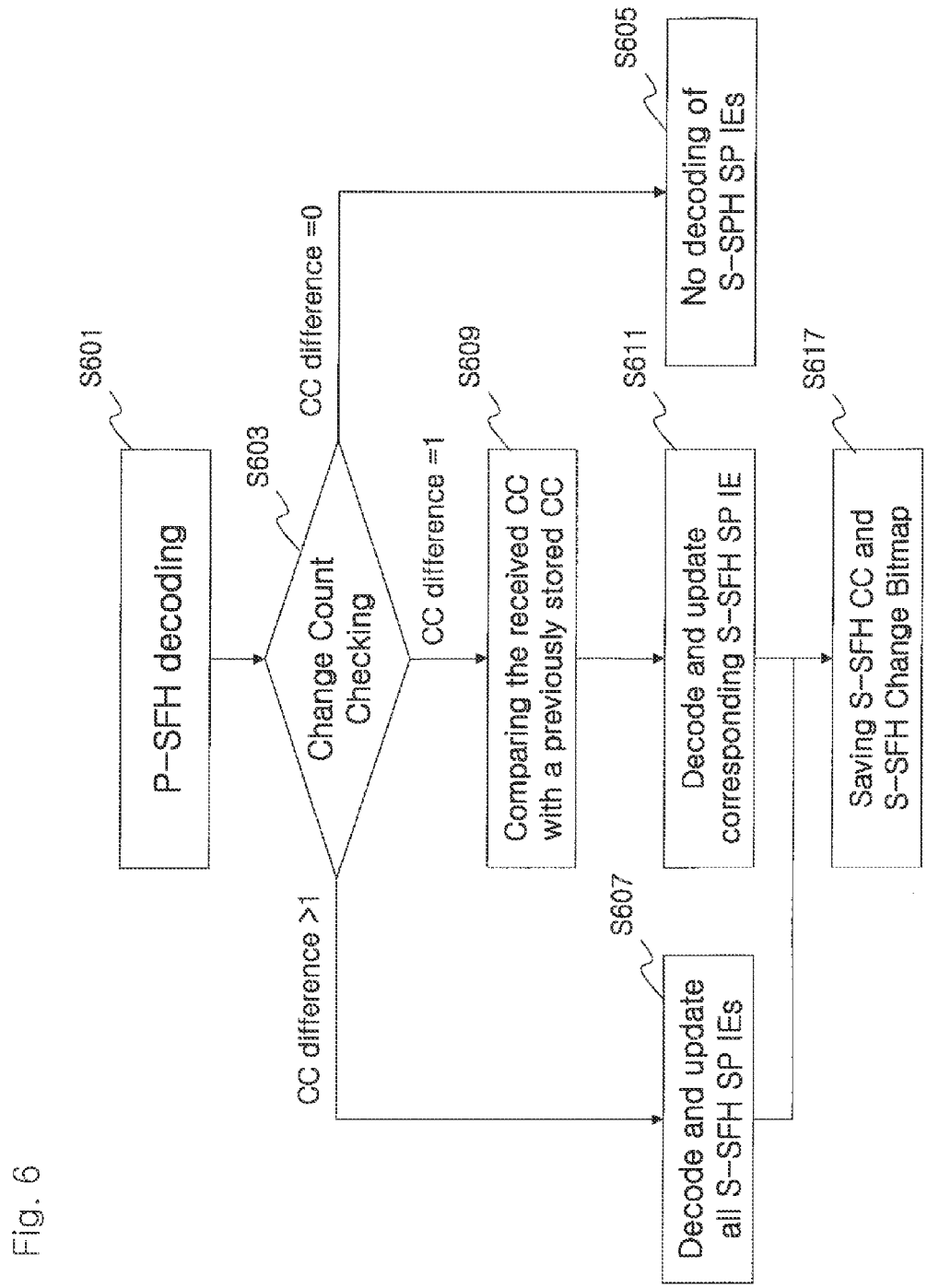
FIG. 6 sequentially shows a process of updating system information according to a first exemplary embodiment of the present invention.

FIG. 6 sequentially shows a process of updating system information according to a first exemplary embodiment of the present invention.

The base station transmits a P-SFH IE including the S-SFH scheduling information bitmap (SI), the S-SFH change count (CC), and the S-SFH subpacket (SP) change bitmap (S-SFH SP CB) to the terminal.

Upon receiving the P-SFH IE from the base station, the terminal decodes the received P-SFH IE (S601).

The terminal decodes the S-SFH change count (CC) and the S-SFH SP change bitmap (CB) information included in the P-SFH IE and determines whether to decode the S-SFH IE.

First, the terminal compares values of each S-SFH CC in the last received P-SFH IE and the last stored P-SFH IE whenever it receives P-SFH IE (S603).

Upon comparison of the CC values, if there is no difference between the two values (CC difference=0), the terminal determines that there is no change at the S-SFH, and omits decoding of every S-SFH IE (S605).

Upon comparison of the CC values, if the difference between the two values is greater than 1 (CC difference>1), the terminal determines that one or more S-SFH IE have been changed and performs decoding on every S-SFH IE (S607). And after performing decoding on every S-SFH IE, the terminal stores the changed S-SFH CC and the S-SFH SP CB (S617).

Upon comparison of the CC, if the difference between the two values is 1 (CC difference=1), the terminal compares S-SFH CB which has been previously received and stored and the newly received S-SFH CB (S609).

According to the changed bitmap comparison result, the terminal determines that the S-SFH SP IE corresponding to the toggled bit position is the changed S-SFH SP IE and decodes and updates the corresponding SP IE (S611).

Thereafter, the terminal stores the changed S-SFH CC and the S-SFH SP CB (S617).

In the exemplary embodiment illustrated in FIG. 6, when the difference between the stored S-SFH change count and the S-SFH change count of the currently received P-SFH is 2, if the same S-SFH SP is continuously changed (the value of the same bit position as the S-SFH SP change bitmap is toggled: 0→1→0), the terminal is able to know whether or not the S-SFH has been changed but cannot know which S-SFH SP has been changed. Thus, in the case where the terminal cannot know which S-SFH SP has been changed, it receives every S-SFH SP and checks whether the difference value of the S-SFH change count is 1 or 2 or larger, and determines it.

Figure 7:
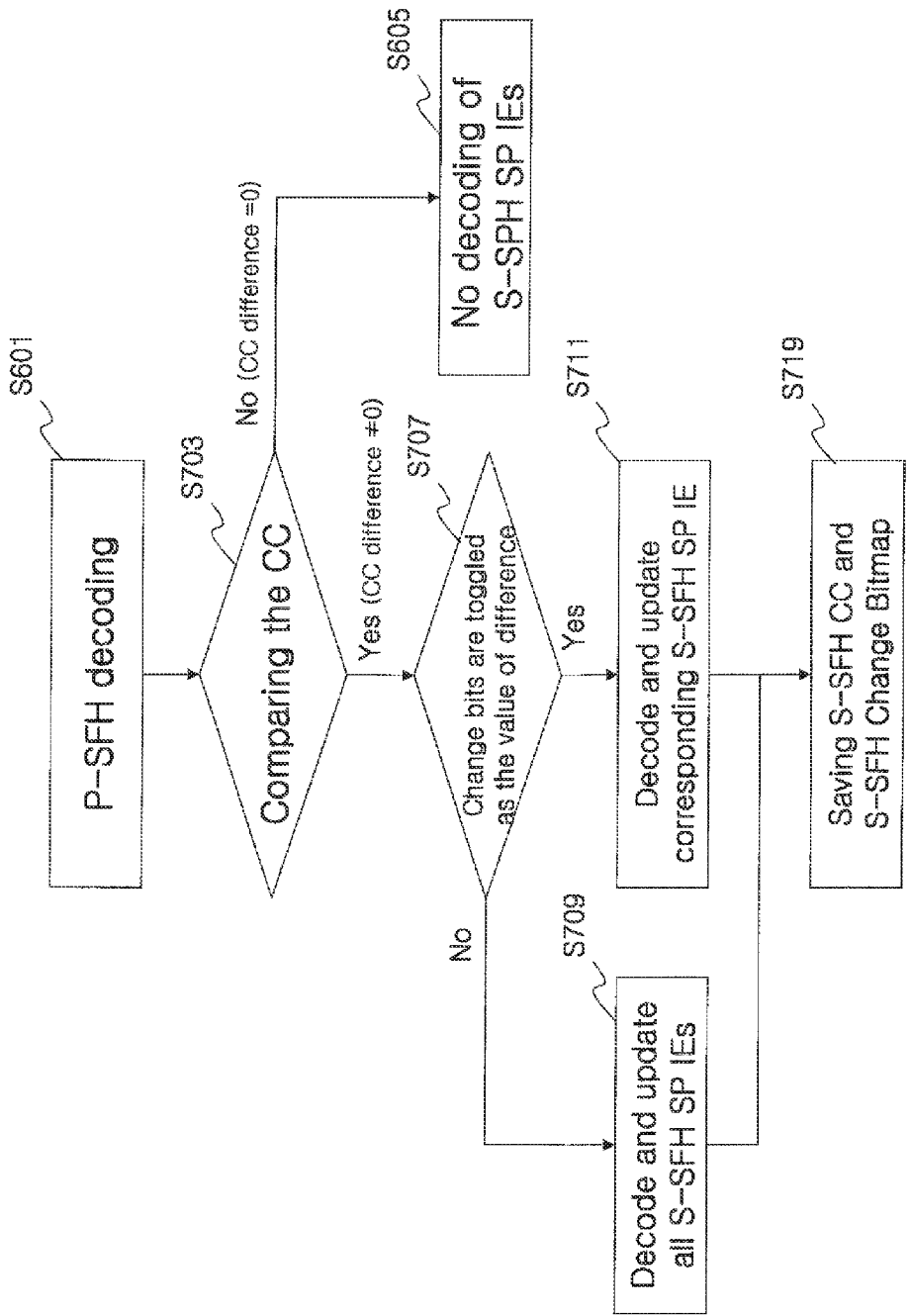
FIG. 7 sequentially shows a process of updating system information according to a second exemplary embodiment of the present invention.

FIG. 7 sequentially shows a process of updating system information according to a second exemplary embodiment of the present invention.

In the exemplary embodiment illustrated in FIG. 7, when it is determined by using the S-SFH change count and the S-SFH SP change bitmap (checking whether or not it is toggled by a difference value), the continuously changed (the value of the same bit position as the S-SFH SP change bitmap is toggled: 0→1→0) S-SFH SP bit information can be recognized.

Like the case illustrated in FIG. 6, the base station transmits the P-SFH IE including the S-SFH scheduling information bitmap (SI), the S-SFH change count (CC) and the S-SFH subpacket (SP) change bitmap (S-SFH SP CB) to the terminal. Upon receiving the P-SFH IE, the terminal decodes the received P-SFH IE (S601).

The terminal decodes the S-SFH change count (CC) and the S-SFH SP change bitmap (CB) information included in the P-SFH IE and determines whether to decode the S-SFH IE, and compares an S-SFH CC value which has been previously received and stored and the newly received S-SFH CC value (S703).

Upon comparison of the CC values, if there is no difference between the two values (CC difference=0), the terminal determines that there is no change in the S-SFH, and omits decoding of every S-SFH IE (S605).

Upon comparison of the CC values, if there is a difference between the two values (CC difference≠0), the terminal compares S-SFH CB which has been previously received and stored and the newly received S-SFH CB in order to determine whether or not the number of toggled bits is the same as the difference between the received CC and the stored CC (S707). When the number of toggled bits is the same as the difference of the CC values, the terminal determines that the S-SFH SP IE corresponding to the toggled bit position is a changed S-SFH SP IE and decodes and updates the corresponding SP IE (S711). For example, if the difference value of S-SFH change count is 2, the stored CB is '000', and the received CB is '011', because the two bits among the bits of the S-SFH SP change bitmap have been toggled, the terminal determines that the number of toggled bits is the same as the difference of the CC values. Thereafter, the terminal decodes and updates the corresponding SP IEs (SP2 and SP3). And the terminal stores the changed S-SFH CC and the S-SFH SP CB (S719).

If the number of toggled bits is not the same as the difference of the CC values, the terminal decodes and updates all S-SFH SP IEs.

Figure 8:
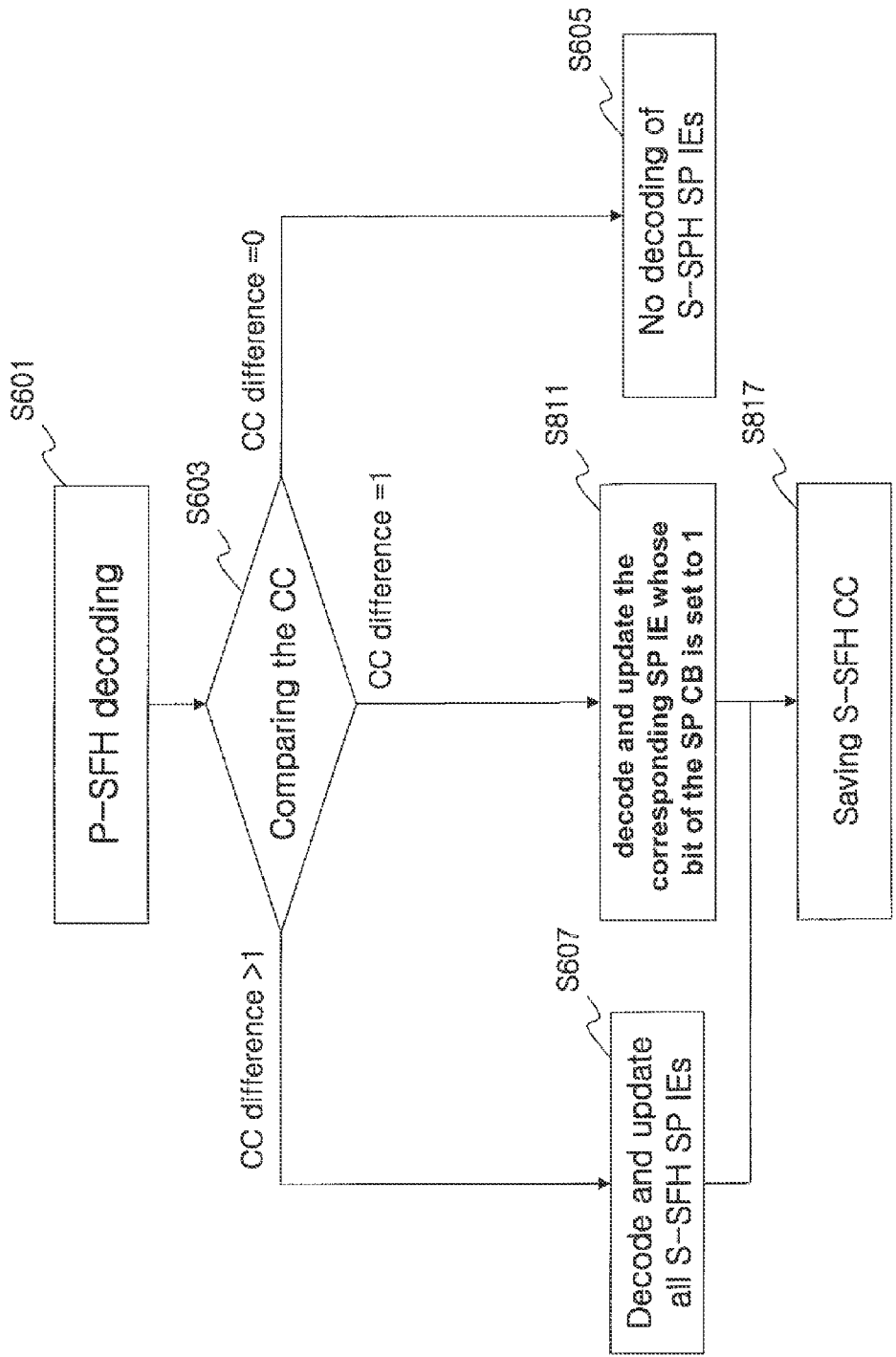
FIG. 8 sequentially shows a process of updating system information according to a third exemplary embodiment of the present invention.

FIG. 8 sequentially shows a process of updating system information according to a third exemplary embodiment of the present invention.

The base station transmits a P-SFH IE including the S-SFH scheduling information bitmap (SI), the S-SFH change count (CC), and the S-SFH subpacket (SP) change bitmap (S-SFH SP CB) to the terminal. In this case, unlike the change bitmap as described above, the base station sets only the values of the bit(s) corresponding to the changed S-SFH SP(s) as 1, and sets the other bit(s) as 0.

Upon receiving the P-SFH IE from the base station, the terminal decodes the received P-SFH IE (S601).

The terminal decodes the S-SFH change count (CC) and the S-SFH SP change bitmap (CB) information included in the P-SFH IE and determines whether to decode the S-SFH IE.

First, the terminal compares an S-SFH CC value which has been previously received and stored and the newly received S-SFH CC value (S603).

Upon comparison of the CC values, if there is no difference between the two values (CC difference=0), the terminal determines that there is no change in the S-SFH, and omits decoding of every S-SFH IE (S605).

Upon comparison of the CC values, if the difference between the two values is greater than 1 (CC difference>1), the terminal determines that one or more S-SFH IE have been changed and performs decoding on every S-SFH IE (S607). And after performing decoding on every S-SFH IE, the terminal stores the changed S-SFH CC (S817).

Upon comparison of the CC values, if the difference between the two values is 1 (CC difference=1), the terminal determines that the corresponding SP IE for decoding and updating is the SP IE whose bit of the SP change bitmap is set to 1. And the terminal decodes and updates the corresponding SP IE (S811).

Thereafter, the terminal stores the changed S-SFH CC (S817).

According to an exemplary embodiment of the present invention, the terminal may update the system information by using the scheduling periodicity information of each S-SFH SP along with the values of the CC and the CB.

The scheduling periodicity information of the S-SFH SP may be transferred to the terminal (1) through a P-SFH, (2) through a particular S-SFH SP in which scheduling periodicity information of different S-SFH SPs is transferred (namely, it includes period information of itself), (3) through a MAC management message (e.g., RNG-REQ/RSP, SBC-REQ/RSP, REG-REQ/RSP) transferred in a network entry procedure, or (4) by defining a fixed period in advance.

The terminal can recognize a transmission period of each S-SFH SP explicitly through one of the foregoing four methods. Also the terminal can recognize the transmission period of each S-SFH SP implicitly upon receiving each S-SFH SP at least two times or more. The terminal determines that the information is valid until when the recognized transmission period information of each S-SFH SP is changed.

Figure 9:
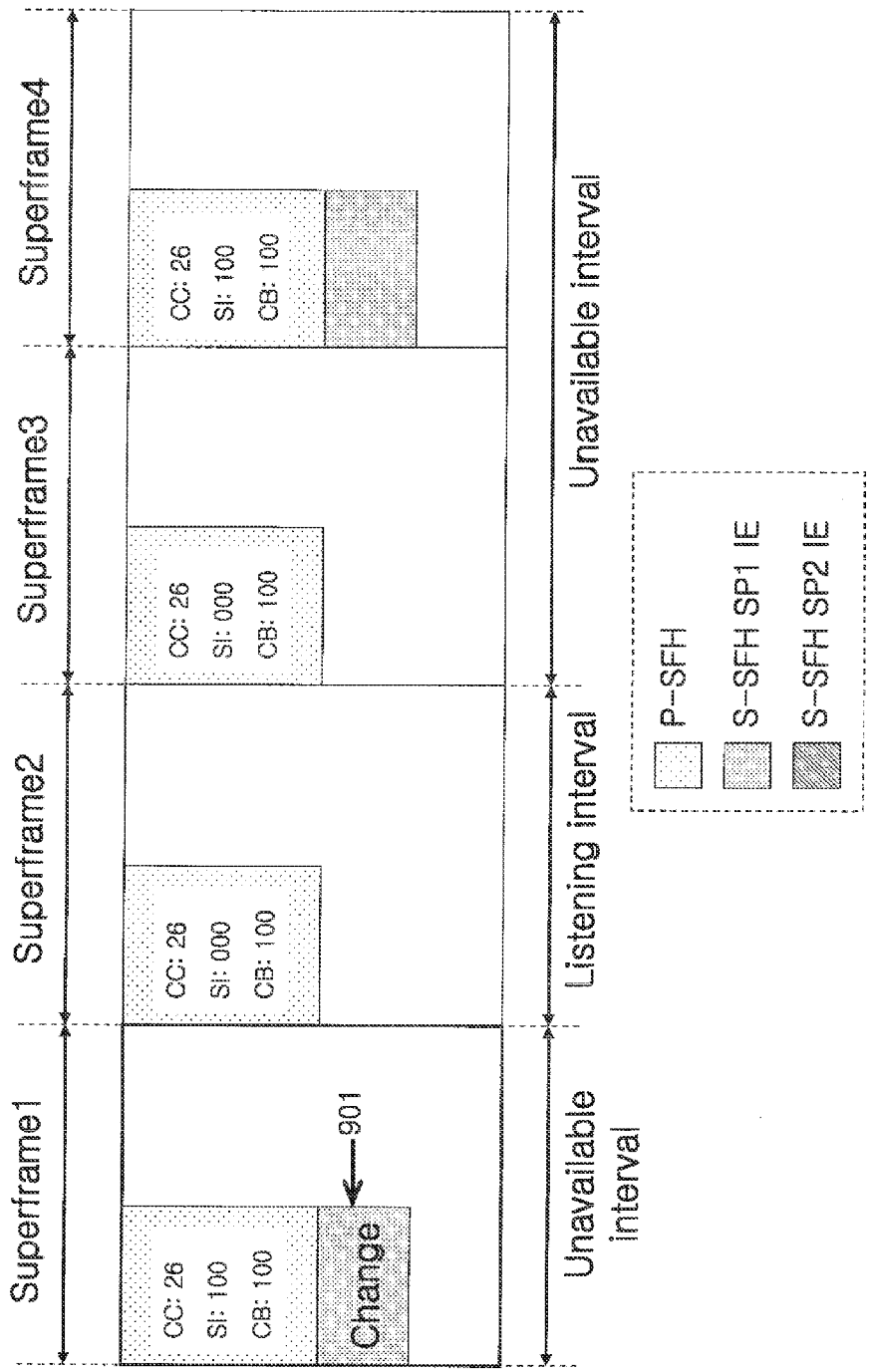
FIG. 9 shows a process of updating an S-SFH by a terminal in a sleep/idle mode according to one exemplary embodiment of the present invention.

FIG. 9 shows a process of updating an S-SFH by a terminal in a sleep/idle mode according to one exemplary embodiment of the present invention.

As illustrated, because the terminal is in an unavailable interval during the superframe 1 in which the changed S-SFH SP is transmitted, it cannot receive the changed S-SFH SP (901) at the superframe 1. During the superframe 2, the terminal is in a listening interval. And the terminal enters the unavailable interval at the superframe 3 and the superframe 4.

Thus, when the terminal in the sleep or idle state fails to receive all the changed S-SFH SP(s) during the listening interval, the corresponding terminal should wake up at a superframe next time when the corresponding S-SFH SP(s) are transmitted during the unavailable interval (power saving/sleep interval) by using the transmission period information of the changed S-SFH SP(s). Preferably, the terminal should wake up at a first superframe next time when the corresponding S-SFH SP(s) are transmitted. Namely, the terminal does not need to wake up at a superframe during which only the S-SFH SP(s) which do not need to be updated are transmitted by using the transmission period information of the changed S-SFH SP(s). After updating the S-SFH SP(s), the terminal may perform a different operation such as turning off power of one or more physical devices or not requiring communication with the base station during the remaining unavailable interval.

If it is assumed that the value of CC and CB in the stored are 25 and '000' and the unavailable interval and the listening interval are determined as illustrated in FIG. 9, the terminal can wake up at the superframe 2 to decode the P-SFH and recognize that the S-SFH SP 1 has been changed through the CC and CB in the corresponding superframe 2. However, the changed S-SFH SP1 is not transmitted during the superframe 2, the corresponding listening interval. Thus, if the fact that the changed S-SFH SP1 is transmitted during the superframe 4 according to the transmission period information of the S-SFH SP1 is recognized, although the superframe 4 is included in the unavailable interval, the terminal wakes up at the corresponding superframe 4 and decodes and updates the corresponding S-SFH SP1.

If corresponding S-SFH SP(s) have not been received during the superframe, during which the corresponding S-SFH SP(s) were predicted to be transmitted within the unavailable interval by using the transmission period information of the changed S-SFH SP(s), then the terminal should maintain in an awake state until when it receives all the corresponding S-SFH SP(s), so the terminal should not be changed to a power saving state. If the terminal first receives the transmission period information of the S-SFH SPs before receiving the changed S-SFH SP(s), the terminal may use the corresponding transmission period in order to update the changed S-SFH SP(s).

Hereinafter, a method of transmitting the scheduling periodicity information which the terminal may detect each of transmitted S-SFH SPs effectively and updating system information using thereof will now be described.

If the information regarding the transmission of S-SFH SPs informed to a terminal is only a transmission periodicity of each S-SFH SPs, the terminal should detect the transmission of each S-SFH SPs frequently to find the transmission of the S-SFH SPs. Also, the terminal should detect the transmission time of each S-SFH SPs at least one more times even though the system information transmitted through the S-SFH SPs are not changed, when the scheduling periodicity of each S-SFH SPs are changed. For the detection of the transmission time of each S-SFH SPs, the terminal should perform a scanning operation every superframe time, and those frequent scanning operation is ineffective to the terminal in sleep/idle state for power saving.

Present invention provides a method that a base station informs not only scheduling periodicity information but also transmission offset information of each S-SFH SPs to a terminal for effective detection of a transmission time of each S-SFH SPs. The scheduling information indicates a transmission interval of the S-SFH SP, and the offset information indicates the transmitted superframe of the S-SFH SP by the distance from the superframe transmitting the scheduling information. Each of the S-SFH SPs has its scheduling information and offset information which is configured by a table format. Below table 1 shows the scheduling periodicity information of each S-SFH SPs.

TABLE 1

| Periodicity configuration index | Description |
| --- | --- |
| 0 | SP 1 - 40 ms, SP 2 - 80 ms, SP 3 - 160 ms |
| 1 | SP 1 - 80 ms, SP 2 - 160 ms, SP 3 - 320 ms |

As shown in table 1, the scheduling periodicity of SP1 is 40 ms, the scheduling periodicity of SP2 is 80 ms and the scheduling periodicity of SP3 is 160 ms when the periodicity configuration index is set to 0. When the periodicity configuration index is set to 1, the scheduling periodicity of SP1 is 80 ms, the scheduling periodicity of SP2 is 160 ms and the scheduling periodicity of SP3 is 320 ms.

The transmission offset information may be configured as a table format according to the configuration of the transmission scheduling periodicity.

FIG. 10 shows a transmission offset information transmitted through a P-SFH when a periodicity configuration index is 0 according to an exemplary embodiment of the present invention.

In this embodiment shown in FIG. 10, the set of offsets having a same offset value may be exist regardless of the starting superframe of each S-SFH SPs. As shown in FIG. 10, the numbers of offset sets are eight when the periodicity configuration index is 0 and the transmission period of a superframe is 20 ms. That is, eight numbers of offset sets from superframe #0 to superframe #7 are continuously repeated through whole superframes. The offset information may be configured by 3-bit to define the eight number of offset sets.

Refer to FIG. 10, the SP1 and offset information of each SPs are transmitted at superframe #0. The offset of the SP1 is 0 to indicate the transmission of SP1 at present superframe #0, the offset of the SP2 is 1 to indicate that the transmission time of the SP2 is the next superframe (superframe #1) from the present superframe #0, and the offset of the SP3 is 3 to indicate that the transmission time of the SP3 is the third superframe (superframe #3) from the present superframe #0. The terminal can detect precise transmission time of each SPs based on the offset information.

FIG. 11 shows a transmission offset information transmitted through a P-SFH when a periodicity configuration index is 1 according to an exemplary embodiment of the present invention.

In this embodiment shown in FIG. 11, the offset sets having a different offset value may be exist according to the starting superframe of each S-SFH SPs. In some cases, the base station may not be transmitted a S-SFH scheduling information bitmap to the terminal because the terminal may recognize each of scheduling information of the S-SFH SPs using the periodicity information, offset configuration index and a S-SFH size. If the base station does not transmit any S-SFH SPs to the terminal, the S-SFH size in the P-SFH is 0. The base station may transmit each S-SFH SPs including an index or type information for the transmitting S-SFH SPs. The terminal may recognize the received SPs as SP1, SP2 or SP3 through the index or type information of S-SFH SP after decoding the received S-SFH SP. The terminal may recognize the transmission time of an S-SFH SP through the scheduling periodicity information of the correspond S-SFH SP. Also, the terminal can recognize the transmitted superframe of another S-SFH SPs through the transmission offset, even though the terminal does not decoding the another S-SFH SP IEs.

FIG. 12 shows a transmission offset information transmitted through an S-SFH SP1 when a periodicity configuration index is 0 according to an exemplary embodiment of the present invention.

In this embodiment shown in FIG. 12, the offset sets having a same offset value may be exist regardless of the starting superframe of each S-SFH SPs. As shown in FIG. 12, the numbers of offset sets are four when the periodicity configuration index is 0 and the transmission period of a superframe is 20 ms. That is, four numbers of offset sets of superframe #0, superframe #2, superframe #4 and superframe #6 are repeated through whole superframes. The offset information may be configured by 2-bit to define the four number of offset sets. The 2-bit offset configuration may include an offset of the S-SFH SP1.

Below table 2 shows the 2-bit offset configuration transmitted through the S-SFH SP1 when a periodicity configuration index is 0 according to an exemplary embodiment of the present invention.

TABLE 2

| Offset configuration index | description |
| --- | --- |
| 00 | SP2 - 1, SP3 - 2 |
| 01 | SP2 - 2, SP3 - 1 |
| 10 | SP2 - 1, SP3 - 4 |
| 11 | SP2 - 2, SP3 - 3 |

FIG. 13 shows a transmission offset information transmitted through an S-SFH SP1 when a periodicity configuration index is 1 according to an exemplary embodiment of the present invention.

In this embodiment shown in FIG. 13, all the offset sets should be defined according to the starting superframe of each S-SFH SPs because the offsets sets having a different offset value may be exist according to the starting superframe of each S-SFH SPs.

When the SP1 is transmitted through the superframe #0 as shown in the FIG. 13, the offsets of the SP2 and SP3 is transmitted through the SP1 to indicate that the transmission time of the SP2 is the next superframe (superframe #1) from the present superframe #0 and the transmission time of the SP3 is the second superframe (superframe #2) from the present superframe #0. The terminal can detect precise transmission time of each SPs based on the offset information.

FIG. 14 shows a transmission offset information transmitted through an S-SFH SP2 when a periodicity configuration index is 0 according to an exemplary embodiment of the present invention.

In this embodiment shown in FIG. 14, the offset sets having a same offset value may be exist regardless of the starting superframe of each S-SFH SPs. As shown in FIG. 14, the numbers of offset sets are two when the periodicity configuration index is 0 and the transmission period of a superframe is 20 ms. That is, two numbers of offset sets of superframe #1 and superframe #5 are repeated through whole superframes. The offset information may be configured by 1-bit to define the two numbers of offset sets. The 1-bit offset configuration may include an offset of the S-SFH SP2.

Below table 3 shows the 1-bit offset configuration transmitted through the S-SFH SP2 when a periodicity configuration index is 0 according to an exemplary embodiment of the present invention.

TABLE 3

| Offset configuration index | description |
| --- | --- |
| 0 | SP1 - 1, SP3 - 2 |
| 1 | SP1 - 1, SP3 - 5 |

FIG. 15 shows a transmission offset information transmitted through an S-SFH SP2 when a periodicity configuration index is 1 according to an exemplary embodiment of the present invention.

In this embodiment shown in FIG. 15, all the offset sets should be defined according to the starting superframe of each S-SFH SPs because the offsets sets having a different offset value may be exist according to the starting superframe of each S-SFH SPs.

When the SP2 is transmitted through the superframe #1 as shown in the FIG. 15, the offsets of the SP1 and SP3 is transmitted through the SP2 to indicate that the transmission time of the SP1 is the third superframe (superframe #4) from the present superframe #1 and the transmission time of the SP3 is the next superframe (superframe #2) from the present superframe #1. The terminal can detect precise transmission time of each SPs based on the offset information.

FIG. 16 shows a transmission offset information transmitted through an S-SFH SP3 when a periodicity configuration index is 0 according to an exemplary embodiment of the present invention.

In this embodiment shown in FIG. 16, the offset sets having a same offset value may be exist regardless of the starting superframe of each S-SFH SPs. As shown in FIG. 16, the numbers of offset set is one when the periodicity configuration index is 0 and the transmission period of a superframe is 20 ms. That is, an offset set of superframe #3 is repeated through whole superframes. The offset information may be configured by 1-bit to define the offset set. The 1-bit offset configuration may include an offset of the S-SFH SP3.

However, all the offset sets transmitted through the S-SFH SP3 should be defined according to the starting superframe of each S-SFH SPs because the offset sets transmitted through the S-SFH SP3 having a different offset value may be exist according to the starting superframe of each S-SFH SPs when the periodicity configuration index is 1. The numbers of offset sets may be fifteen when the periodicity configuration index is 1. Below table 4 shows a 4-bit offset configuration transmitted through the S-SFH SP3 when the periodicity configuration index is 1.

TABLE 4

| Offset configuration index | description |
| --- | --- |
| 0000 | SP1 - 1, SP2 - 2 |
| 0001 | SP1 - 1, SP2 - 3 |
| 0010 | SP1 - 1, SP2 - 4 |
| 0011 | SP1 - 1, SP2 - 6 |

TABLE 4-continued

| Offset configuration index | description |
| --- | --- |
| 0100 | SP1 - 1, SP2 - 7 |
| 0101 | SP1 - 2, SP2 - 1 |
| 0110 | SP1 - 2, SP2 - 3 |
| 0111 | SP1 - 2, SP2 - 4 |
| 1000 | SP1 - 2, SP2 - 5 |
| 1001 | SP1 - 2, SP2 - 7 |
| 1010 | SP1 - 3, SP2 - 1 |
| 1011 | SP1 - 3, SP2 - 2 |
| 1100 | SP1 - 3, SP2 - 4 |
| 1101 | SP1 - 3, SP2 - 5 |
| 1110 | SP1 - 3, SP2 - 6 |

Figure 17:
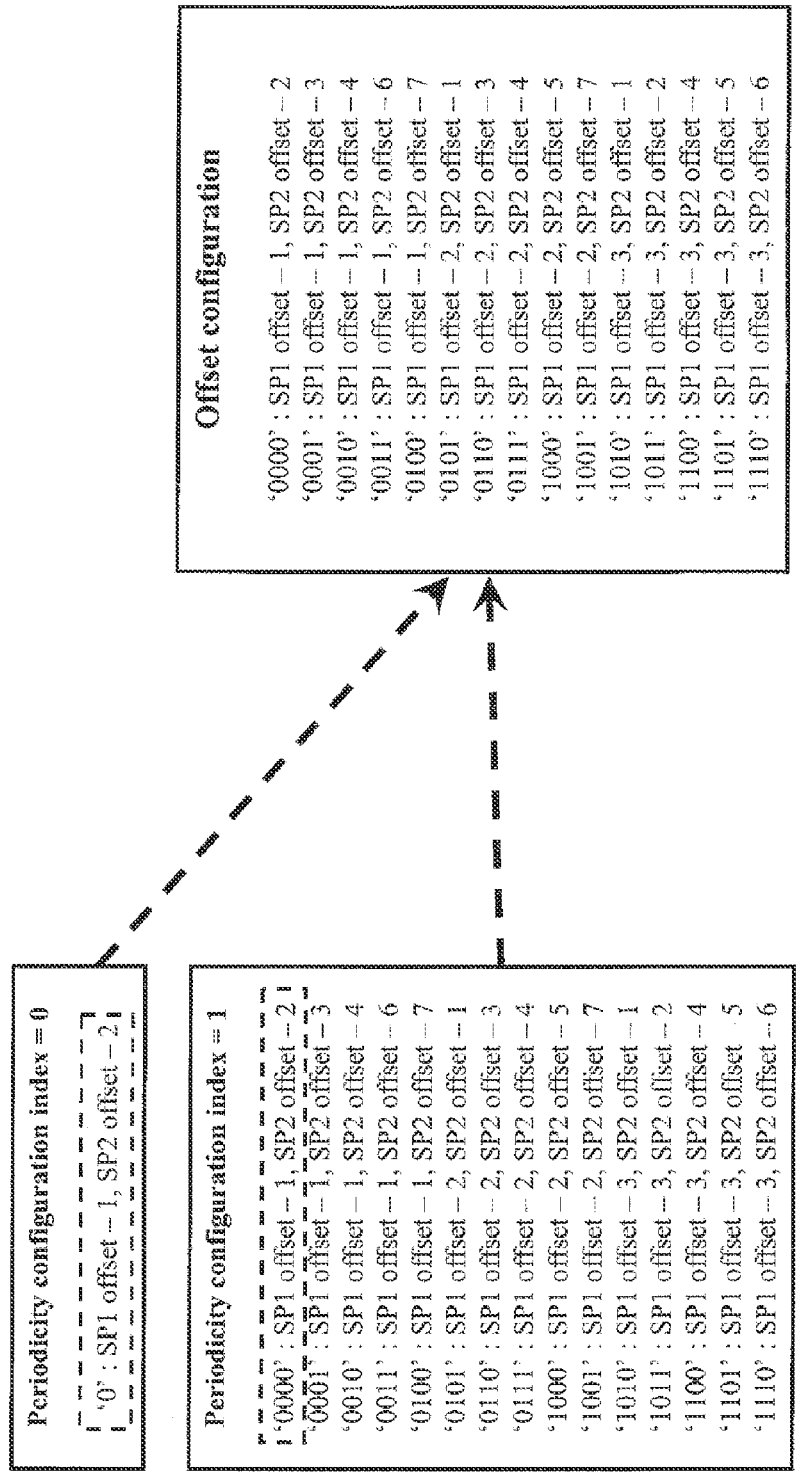
FIG. 17 shows an integrated set of transmission offsets transmitted through an S-SFH SP3 according to an exemplary embodiment of the present invention.

FIG. 17 shows an integrated set of transmission offsets transmitted through an S-SFH SP3 according to an exemplary embodiment of the present invention.

As shown in FIG. 17, the offset sets according to each of the periodicity configuration index may be configured to an integrated table. The overlapped offset values, for example the offset '0' of the periodicity configuration index 0 and the offset '0000' of the periodicity configuration index 1 are substantially same value, may be integrated as one offset value.

Transmission offset information may be configured as a simplified information, not the precise information according to another embodiment of the present invention. The simplified offset information indicates roughly the transmission periods of another S-SFH SPs by dividing the transmission periodicity of the specific S-SFH SP transmitting a periodicity information and offset information into n periods.

FIG. 18 shows a simplified transmission offset information transmitted through an S-SFH SP3 according to an exemplary embodiment of the present invention.

As shown in FIG. 18, the periodicity of the S-SFH SP3 is divided into two periods ($1^{st}$ period and $2^{nd}$ period), and the simplified offset information indicates roughly the transmission periods of S-SFH SP1 and SP2 using the divided periods indication. The offset of S-SFH SP1 is 0 to indicate that the first transmission time of the S-SFH SP1 is in the first period roughly and the offset of S-SFH SP2 is 1 to indicate that the first transmission time of the S-SFH SP2 is in the second period roughly. The terminal receives the simplified offset information of the SP1 at superframe #2, and may detect system information transmitted through the SP1 by scanning continuously after the receiving of the information because the simplified offset information of the SP1 indicates the first period. And then, the terminal decodes and updates the system information transmitted through the SP1. If the system information transmitted through the SP2 need to be updated, the terminal receives the simplified offset information of the SP2 at superframe #2 and may detect system information transmitted through the SP2 by scanning during the second period. Preferably the terminal may be performed a micro sleep mode in the first period for saving power consumption.

According to another embodiment of the present invention, a base station may indicate a transmission time of each S-SFH SPs by distance from the superframe transmitting the transmission periodicity information.

Figure 19:
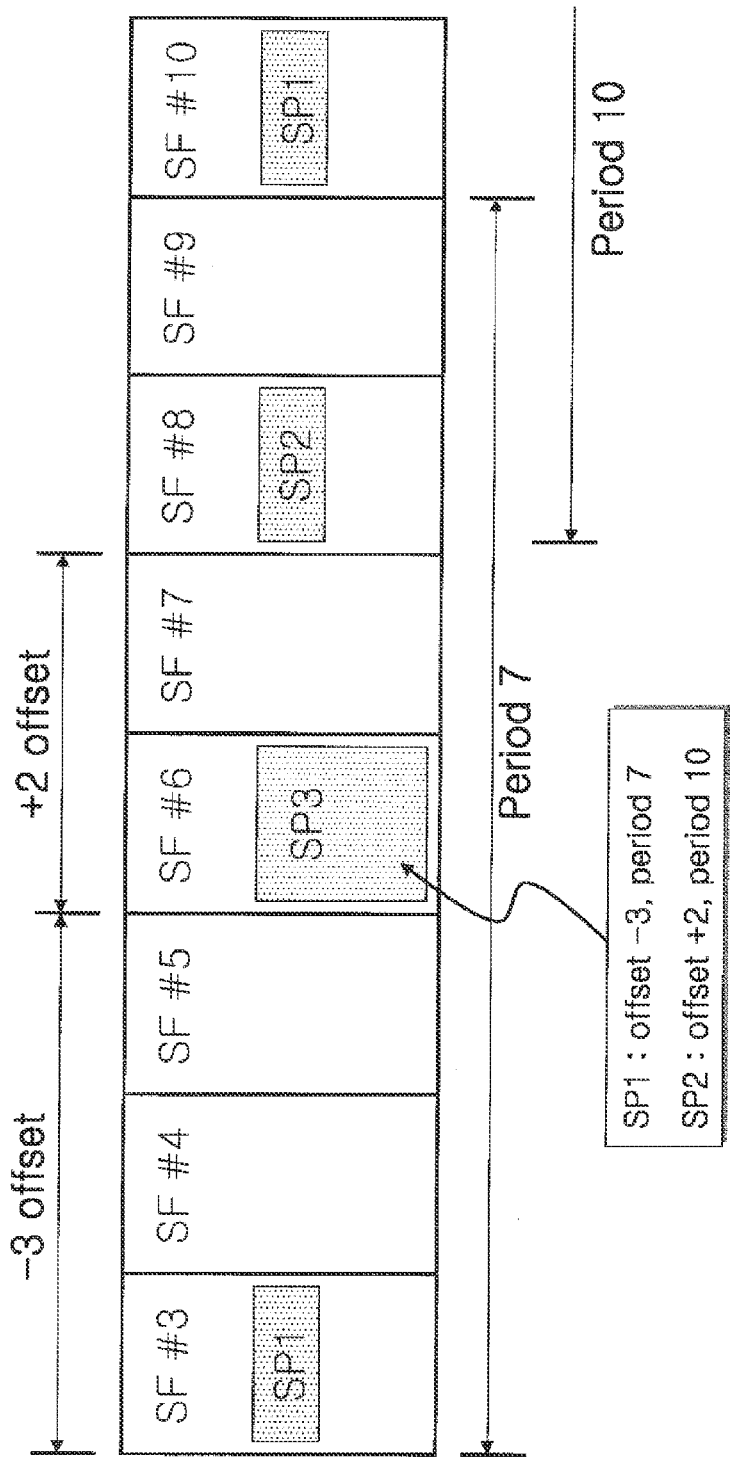
FIG. 19 shows an indicating method of transmission periodicity information and transmission offset information of S-SFH SPs according to an exemplary embodiment of the present invention.

FIG. 19 shows an indicating method of transmission periodicity information and transmission offset information of S-SFH SPs according to an exemplary embodiment of the present invention.

As shown in FIG. 19, the scheduling periodicity information and offset information is transmitted at superframe #6 through the SP3, and the S-SFH SP1 was transmitted three superframes before the superframe #6 (superframe #3) and is transmitted as the period of every 7 superframes. So, the base station transmits the offset information of '−3' and the periodicity information of 7 of the S-SFH SP1 to the terminal. The S-SFH SP2 will be transmitted two superframes after the superframe #6 (superframe #8) and is transmitted as the period of every 10 superframes. So, the base station transmits the offset information of '+2' and the periodicity information of 10 of the S-SFH SP2 to the terminal. The terminal receives the S-SFH SP3 at superframe #6 including the offset information and periodicity information regarding the S-SFH SP1 and SP2, and recognizes the transmission time of the SP1 and SP2 without scanning operation.

According to another embodiment of the present invention, a terminal may update the changed system information using scheduling periodicity information of each S-SFH SPs. If the terminal detects that the changed S-SFH SP is not received at the scheduled superframe during unavailable interval, the transmission periodicity of the corresponding S-SFH SP is changed and the S-SFH SP3 containing the periodicity information is changed. In that case, the terminal shall wake up (normal mode) until it receives the changed S-SFH SP.

Before receiving the changed S-SFH SP, if the terminal receives scheduling periodicity information, the terminal can use the scheduling periodicity information to update the changed S-SFH SP. Namely, the terminal may skip the scanning operation during the superframes transmitting unchanged S-SFH SP.

Figure 20:
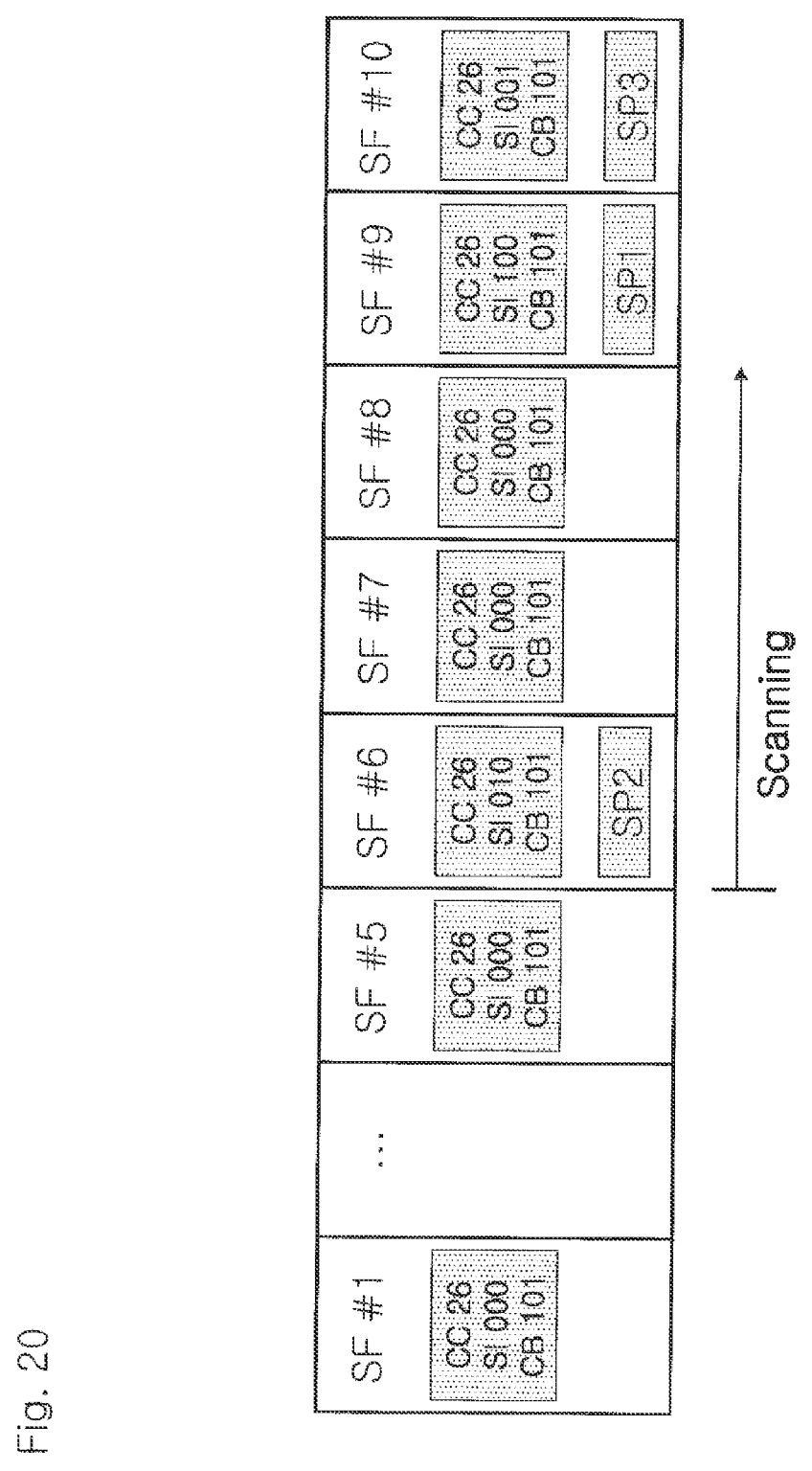

FIG. 20 shows an update method of S-SFH when the terminal detects that the changed S-SFH SP is not scheduled as defined in the last SP scheduling periodicity information according to an exemplary embodiment of the present invention.

As described above, the CC and CB may be transmitted at every superframe through the P-SFH from the base station and the terminal stores the CC and CB its memory. The last received and stored CC is 25 and CB is 000.

The terminal recognizes a change of S-SFH SP1 and SP3 through the CB (101) at superframe #1. The terminal may expect a transmission of S-SFH SP1 in superframe #5 and a transmission of S-SFH SP3 in superframe #10 using the scheduling periodicity information and offset information. If the transmission time of the SP1 and SP3 is included in an unavailable interval (power saving/sleep interval), the terminal wakes up at superframe #5 from the power saving state. However, the terminal detects that the S-SFH SP1 is not scheduled at the superframe #5 defined in the last scheduling periodicity information or recognized implicitly, the terminal continuously performs the scanning operation for checking P-SFH to detect the S-SFH SP1 and SP3 from the superframe #6. The terminal may recognize that the S-SFH SP1 and SP3 are not scheduled from superframe #6 to superframe #8 through the SFH scheduling information bitmap by the checking of the P-SFH. Through the continuous scanning operation in wake up mode, the terminal can receive the S-SFH SP1 at superframe #9 and the S-SFH SP3 at superframe #10.

Figure 21:
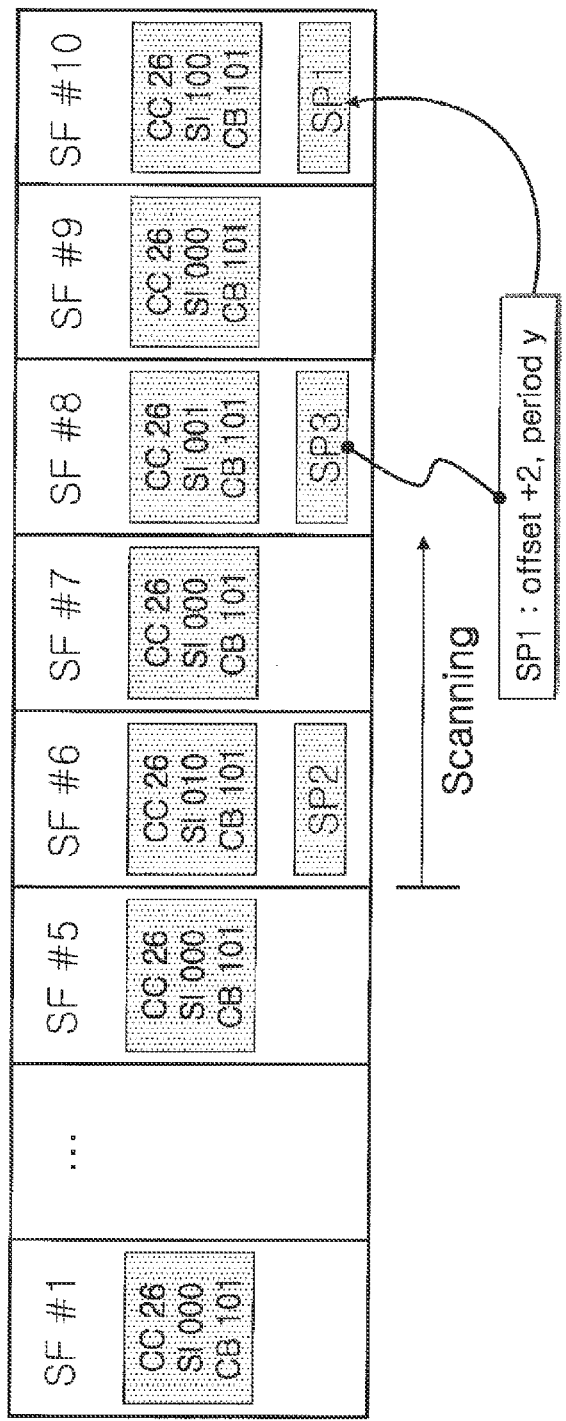
FIG. 21 shows an update method of S-SFH when the terminal detects that the changed S-SFH SP is not scheduled as defined in the last SP scheduling periodicity information according to another embodiment of the present invention.

FIG. 21 shows an update method of S-SFH when the terminal detects that the changed S-SFH SP is not scheduled as defined in the last SP scheduling periodicity information according to another embodiment of the present invention.

If the terminal receives scheduling periodicity information and offset information of the S-SFH SP1 through the S-SFH SP3 at superframe #8 before receiving the S-SFH SP1 at superframe #10, the terminal can recognize the transmission time of S-SFH SP1 at superframe #10 through the received scheduling periodicity information and offset information of the S-SFH SP1. Accordingly, the terminal does not check the P-SFH transmitted at superframe #9.

Figure 22:
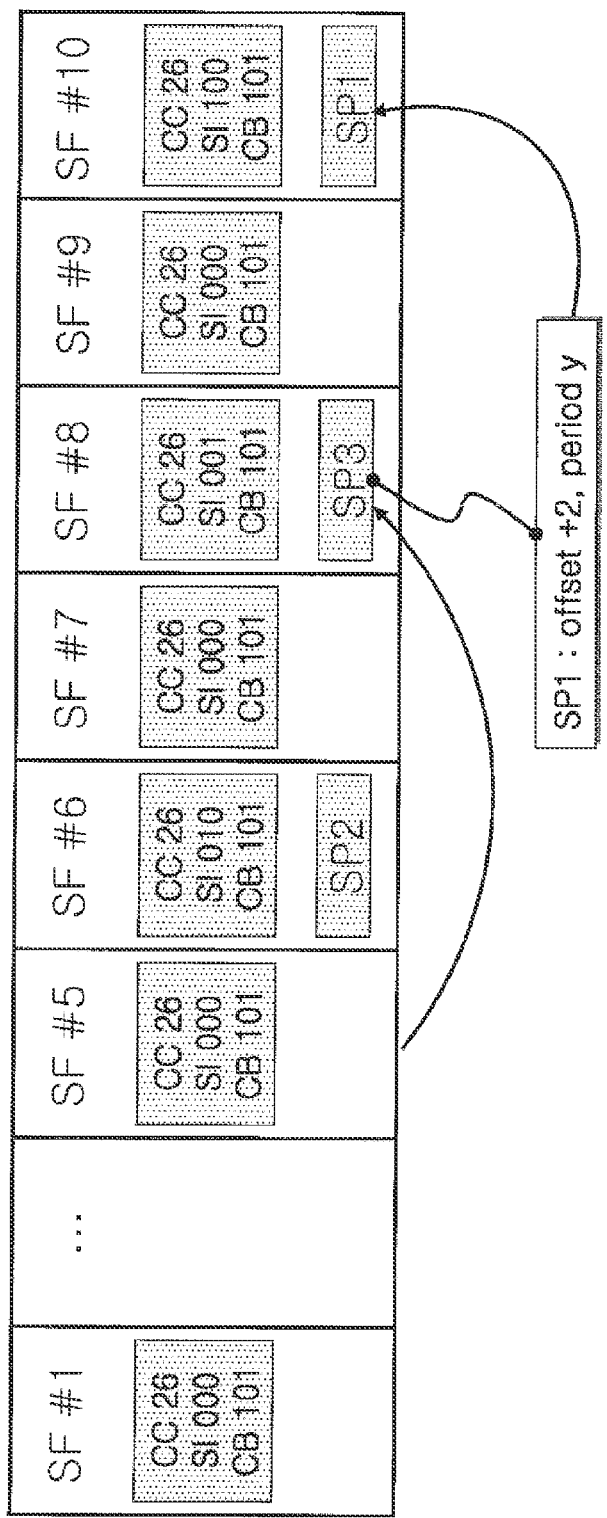
FIG. 22 shows an update method of S-SFH when the terminal detects that the changed S-SFH SP is not scheduled as defined in the last SP scheduling periodicity information according to the other embodiment of the present invention.

FIG. 22 shows an update method of S-SFH when the terminal detects that the changed S-SFH SP is not scheduled as defined in the last SP scheduling periodicity information according to the other embodiment of the present invention.

When the terminal recognizes that the changed S-SFH SP is not scheduled as defined transmission time, the terminal may receive the S-SFH SP3 transmitting the scheduling periodicity information. Like the case illustrated in FIG. 20, the last received and stored CC is 25 and CB is 000.

The terminal recognizes a change of S-SFH SP1 and SP3 through the CB (101) at superframe #1. The terminal may expect a transmission of S-SFH SP1 in superframe #5 and a transmission of S-SFH SP3 in superframe #8 using the scheduling periodicity information and offset information. If the transmission time of the SP1 and SP3 is included in an unavailable interval (power saving/sleep interval), the terminal wakes up at superframe #5 from the power saving state. However, the terminal detects that the S-SFH SP1 is not scheduled at the superframe #5 defined in the last scheduling periodicity information, the terminal only check the superframe #8 previously scheduled the transmission of S-SFH SP3 without performing the scanning operation for checking P-SFH from the superframe #6. After recognizing the transmission time of the S-SFH SP1 (in superframe #10) through the scheduling periodicity information and offset information transmitted by the S-SFH SP3 at superframe #8, the terminal wakes up and receives the S-SFH SP1 at superframe #10.

Figure 23:
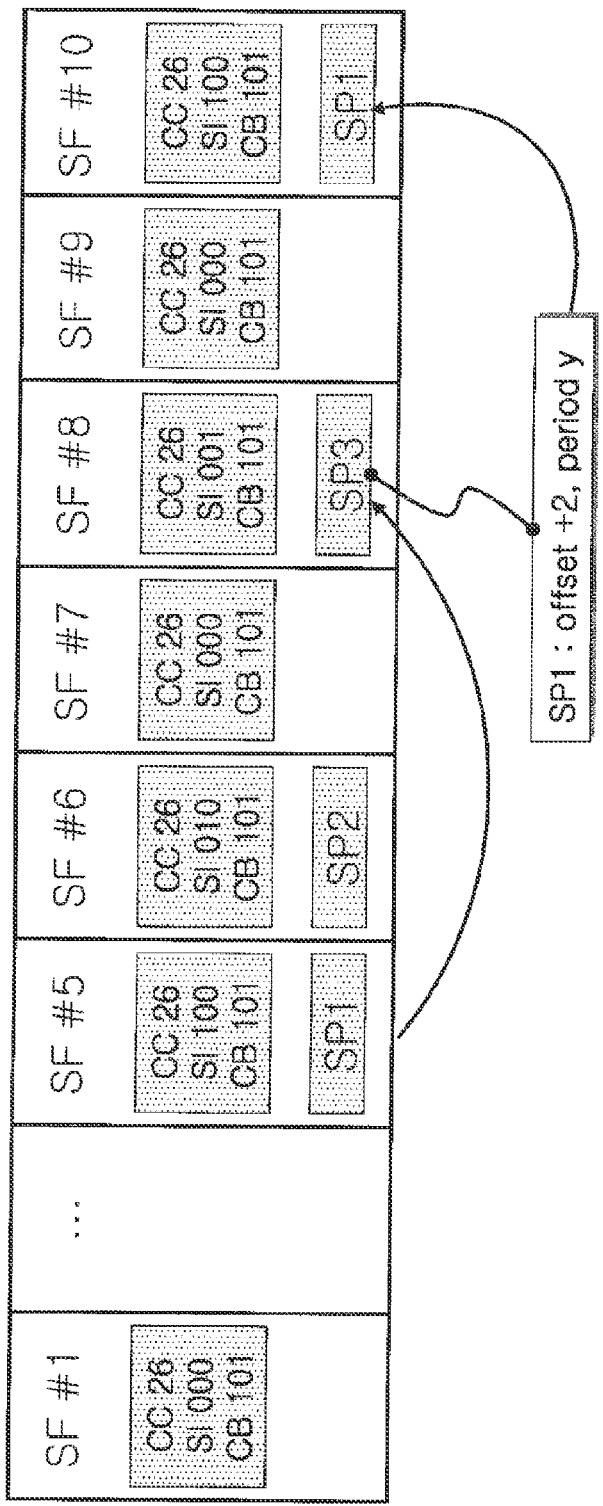
FIG. 23 shows an update method of S-SFH SP when the SP scheduling periodicity information is changed according to an exemplary embodiment of the present invention.

According to another embodiment of the present invention, if the scheduling periodicity of the S-SFH SP is changed, the base station may transmit the S-SFH SP at the previous scheduling periodicity as well as at the changed scheduling periodicity during a predetermined time period, FIG. 23 shows an update method of S-SFH SP when the SP scheduling periodicity information is changed according to an exemplary embodiment of the present invention.

As described above, the CC and CB may be transmitted at every superframe through the P-SFH from the base station and the terminal stores the CC and CB its memory. The last received and stored CC is 25 and CB is 000. The terminal recognizes a change of S-SFH SP1 and SP3 through the CB (101) at superframe #1. The terminal may expect a transmission of S-SFH SP1 in superframe #5 and a transmission of S-SFH SP3 in superframe #8 using the scheduling periodicity information and offset information. If the transmission time of the SP1 and SP3 is included in an unavailable interval (power saving/sleep interval), the terminal wakes up at superframe #5 from the power saving state.

The terminal receives the S-SFH SP1 at superframe #5 and the S-SFH SP3 at superframe #8. At superframe #8, the terminal can recognize changed transmission periodicity and offset information of the S-SFH SP1 through the S-SFH SP3, if the transmission periodicity and offset of the S-SFH SP1 is changed. And then, the terminal can receive the S-SFH SP1 which is changed its transmission time at superframe #10.

Figure 24:
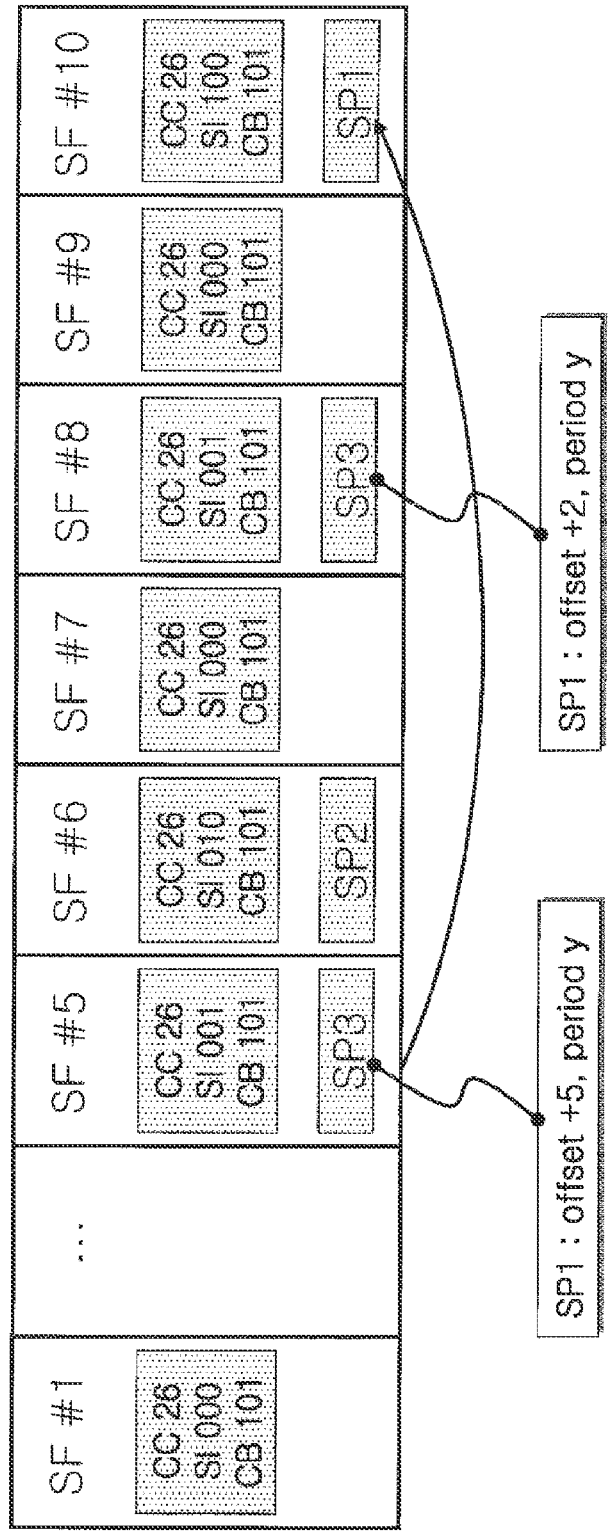
FIG. 24 shows an update method of S-SFH SP when the SP scheduling periodicity information is changed according to another embodiment of the present invention.

FIG. 24 shows an update method of S-SFH SP when the SP scheduling periodicity information is changed according to another embodiment of the present invention.

A base station may transmit the S-SFH SP3 instead of a previously scheduled S-SFH SP1 or SP2 whose transmission period is changed during a predetermined period, if the transmission time of the S-SFH SP1 or SP2 is changed.

As described above, the CC and CB may be transmitted at every superframe through the P-SFH from the base station and the terminal stores the CC and CB its memory. The last received and stored CC is 25 and CB is 000. The terminal recognizes a change of S-SFH SP1 and SP3 through the CB (101) at superframe #1. The terminal may expect a transmission of S-SFH SP1 in superframe #5 and a transmission of S-SFH SP3 in superframe #8 using the scheduling periodicity information and offset information. If the transmission time of the SP1 and SP3 is included in an unavailable interval (power saving/sleep interval), the terminal wakes up at superframe #5 from the power saving state.

At superframe #5, the terminal receives the S-SFH SP3 instead of the S-SFH SP1 as shown in FIG. 24. Through the S-SFH SP3, the terminal can recognize the transmission time of the S-SFH SP1 whose transmission period is changed at superframe #10. Accordingly, the terminal can receive the S-SFH SP1 normally at superframe #10.

Figure 25:
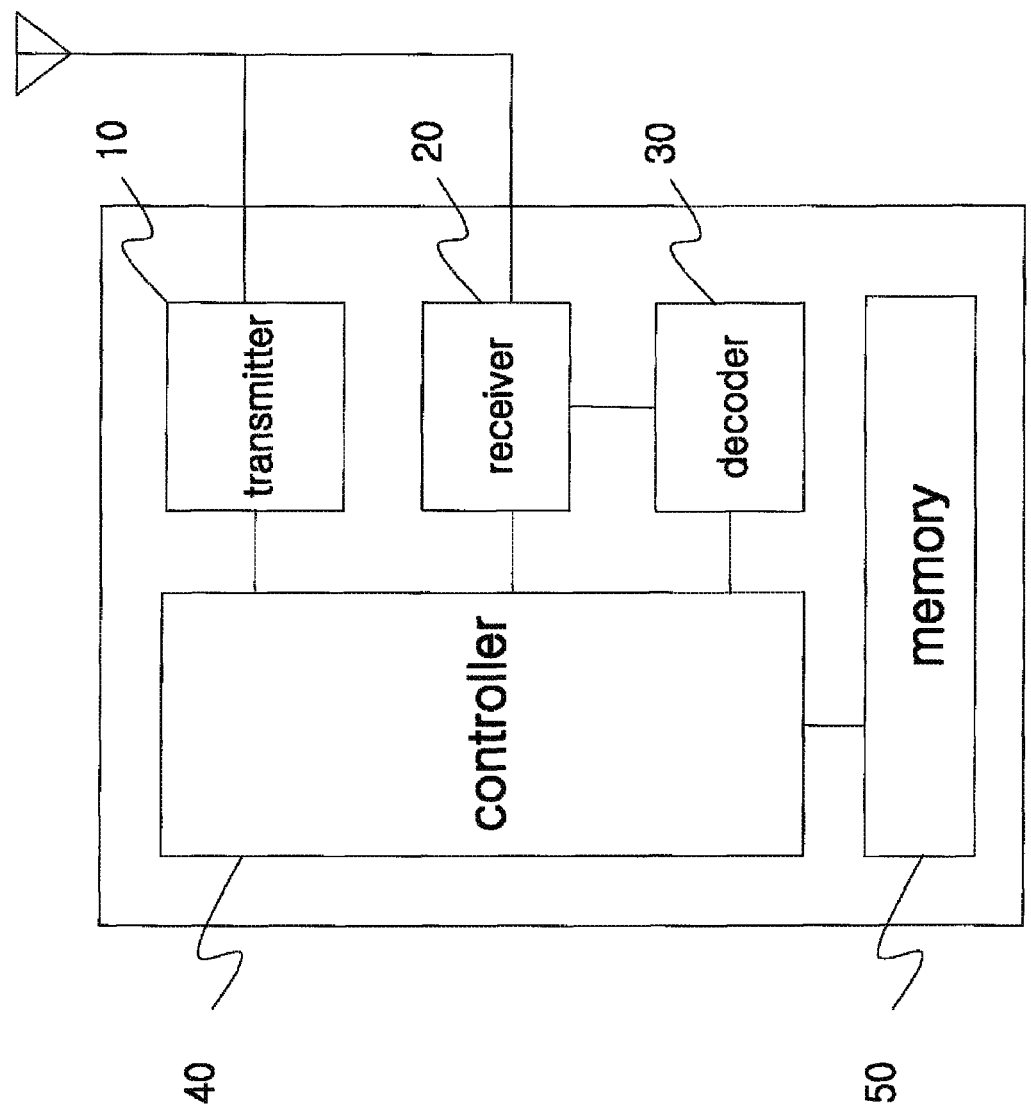
FIG. 25 shows a schematic block diagram of a terminal performing the operation of updating system information according to an exemplary embodiment of the present invention

FIG. 25 shows a schematic block diagram of a terminal performing the operation of updating system information according to an exemplary embodiment of the present invention.

The terminal performing the operation of updating system information includes a transmitter 10, a receiver 20, a decoder 30, a controller 40, and a memory 50.

The receiver 20 receives data, system information and changing information indicating changing status of the system information transmitted by means of a superframe including a P-SFH and at least one of S-SFH SP from the base station.

The changing information includes the change count (CC) and change bitmap (CB). As described above, the CC and CB may be transmitted at every superframe through the P-SFH from the base station and the terminal stores the CC and CB its memory 50. Moreover, scheduling periodicity information indicating transmission periodicity of the subpacket may be transmitted by means of a predetermined subpacket or the P-SFH.

The decoder 30 decodes a P-SFH information element (IE) including a scheduling information bitmap, a change count, and a subpacket (SP) change bitmap of the S-SFH in the received superframe.

The controller 40 detects that changed system information transmitted by means of the subpacket is not scheduled as indicated in the scheduling periodicity information, the controller 40 controls a system operation mode as wake-up mode until the changed system information is received. Before receiving the S-SFH SP, if the terminal receives the scheduling periodicity information through the P-SFH or a specific S-SFH SP, it can use this information to update the changed system information transmitted through S-SFH SPs.

The controller 40 controls the operation of decoding and updating the information elements of S-SFH SP by comparing the change count and the change bitmap stored in the memory 50 and the received change count and the change bitmap. Also, the controller 40 compares the change count stored in the memory 50 and the received change count, and if there is no difference between the two values, the controller 40 does not decode the S-SFH information element, while if there is a difference between the two values, the controller 40 compares the SP change bitmap stored in the memory 50 and the received SP change bitmap.

As described above, upon comparing the SP change bitmap stored in the memory and the received SP change bitmap, if the number of toggled bits is equal to the difference between the change count values, the controller 40 decodes S-SFH SPs corresponding to the positions of the toggled bits in the received superframe, and if the number of toggled bits is different from the difference between the change counts, the controller 40 decodes every S-SFH SP of the superframe. Or, when only the value of the bits corresponding to the changed S-SFH SP(s) is set to be 1 while the other remaining bits are set to be '0', the controller 40 decodes S-SFH SPs having a bit value '1' in the received superframe.

As described above, besides the above-described elements, the device according to the present invention basically includes software and hardware, for example, an output unit (display, speaker, etc.), an input unit (keypad, microphone, etc.), a memory, a transmission and reception unit (RF module, antenna, etc.), and the like, required for implementing the technical idea of the present invention. These elements are obvious to the skilled person in the art, so its detailed description will be omitted.

In an exemplary embodiment of the present invention, the above-described method can be implemented by software, hardware or their combination. For example, the method according to the present invention can be stored in a storage medium (for example, an internal memory of a mobile terminal, a flash memory, a hard disk, etc.) and implemented by codes or commands in a software program that can be executed by a processor (e.g., an internal microprocessor of a mobile terminal).

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A method for updating system information in a terminal in which data is transmitted via superframes, the method comprising:
   receiving scheduling periodicity information of the system information and change information indicating a change in content of the system information, the received change information transmitted via a superframe header (SFH), the SFH comprising a primary SFH (P-SFH) including the change information and a secondary SFH (S-SFH) including at least one subpacket containing the system information, the received scheduling periodicity information indicating a transmission periodicity of the at least one subpacket;
   updating the system information based on the received change information; and
   waking up the terminal until the terminal receives information related to the updated system information when the terminal detects that the system information is not the updated system information.

2. The method of claim 1, wherein:
   the S-SFH comprises three subpackets that each have a different transmission periodicity;
   the received change information comprises a bitmap including three bits, each of the three bits indicating a changing status of one of the three subpackets; and
   the method further comprising toggling or setting a bit at a corresponding position in the bitmap to 1 when a value of any of the three subpackets changes.

3. The method of claim 1, wherein the change information comprises a change count that is incremented by 1 modulo 16 when any value of the at least one subpacket changes.

4. The method of claim 1, further comprising:
   storing the received change information in a memory, wherein the S-SFH comprises three subpackets that each have a different transmission periodicity and the change information includes a change count and a bitmap, the bitmap including three bits each indicating a changing status of one of the three subpackets, wherein updating the system information comprises comparing the change count with a stored change count, and wherein updating the system information is based on the bitmap when a difference between the received change count and the stored change count exists.

5. The method of claim 1, the method further comprising:
receiving transmission offset information indicating a distance between a superframe containing the at least one subpacket and a superframe containing the scheduling periodicity information.

6. The method of claim 1, wherein the scheduling periodicity information is received via the at least one subpacket.

7. An apparatus for updating system information, the apparatus comprising:
a receiver for receiving scheduling periodicity information of the system information transmitted via a superframe header (SFH) and change information indicating a change of content of the system information, the SFH comprising a primary SFH (P-SFH) including the change information and a secondary SFH (S-SFH) including at least one subpacket containing the system information, the received scheduling periodicity information indicating transmission periodicity of the at least one subpacket; and a controller for:
updating the system information based on the received change information, and
waking up the terminal until the terminal receives information related to the updated system information when the controller detects that the system information is not the updated system information.

8. The apparatus of claim 7, wherein:
the S-SFH comprises three subpackets that each have a different transmission periodicity;
the received change information comprises a bitmap including three bits, each of the three bits indicating a changing status of one of the three subpackets; and
the controller is further for toggling or setting a bit at a corresponding position in the bitmap to 1 when a value of any of the three subpackets changes.

9. The apparatus of claim 7, wherein the received change information comprises a change count that is incremented by 1 modulo 16 when any value of the at least one subpacket changes.

10. The apparatus of claim 7, further comprising:
a memory for storing the received change information, wherein the S-SFH comprises three subpackets that each have a different transmission periodicity and the change information includes a change count that is received by the receiver and a bitmap including three bits, each of the three bits indicating a changing status of one of the three subpackets, wherein the controller is further for:
comparing the received change count with a change count that is stored in the memory, and
updating the system information based on the bitmap when difference between the received change count and the stored change count exists.

11. The apparatus of claim 7, wherein the receiver is further for receiving transmission offset information indicating a distance between a superframe containing the at least one subpacket and a superframe containing the scheduling periodicity information.

12. The apparatus of claim 7, wherein the scheduling periodicity information is received via the at least one subpacket.

* * * * *